US012588069B2

(12) United States Patent
    Shin et al.

(10) Patent No.:     US 12,588,069 B2
(45) Date of Patent:        Mar. 24, 2026

(54) METHOD AND DEVICE FOR TRANSMITTING AND RECEIVING WIRELESS SIGNAL IN WIRELESS COMMUNICATION SYSTEM

(71) Applicant: LG ELECTRONICS INC., Seoul (KR)

(72) Inventors: Seokmin Shin, Seoul (KR); Seonwook Kim, Seoul (KR); Suckchel Yang, Seoul (KR); Sechang Myung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 326 days.

(21) Appl. No.: 18/261,459

(22) PCT Filed: Jan. 13, 2022

(86) PCT No.: PCT/KR2022/000654
    § 371 (c)(1),
    (2) Date: Jul. 13, 2023

(87) PCT Pub. No.: WO2022/154524
    PCT Pub. Date: Jul. 21, 2022

(65) Prior Publication Data
    US 2024/0306208 A1      Sep. 12, 2024

Related U.S. Application Data

(60) Provisional application No. 63/280,630, filed on Nov. 18, 2021, provisional application No. 63/278,519, filed on Nov. 12, 2021.

(30) Foreign Application Priority Data

| | | |
|---|---|---|
| Jan. 14, 2021 | (KR) | .......................... 10-2021-0005580 |
| Apr. 2, 2021 | (KR) | .......................... 10-2021-0043523 |
| Jun. 10, 2021 | (KR) | .......................... 10-2021-0075361 |

(51) Int. Cl.
    *H04W 72/04*        (2023.01)
    *H04W 74/0833*      (2024.01)
            (Continued)

(52) U.S. Cl.
    CPC ....... *H04W 72/04* (2013.01); *H04W 74/0833* (2013.01); *H04W 74/0836* (2024.01); *H04W 74/0838* (2024.01)

(58) Field of Classification Search
    CPC ............................... H04L 12/28; H04L 12/50
            (Continued)

(56) References Cited

U.S. PATENT DOCUMENTS

| | | | |
|---|---|---|---|
| 11,622,340 B2 * | 4/2023 | Si | .......................... H04L 5/0048 |
| | | | 370/329 |
| 2019/0281624 A1 | 9/2019 | Kim et al. | |

(Continued)

FOREIGN PATENT DOCUMENTS

| | | |
|---|---|---|
| KR | 1020200128075 | 11/2020 |
| KR | 1020210004711 | 1/2021 |

(Continued)

OTHER PUBLICATIONS

PCT International Application No. PCT/KR2022/000654, International Search Report dated Apr. 25, 2022, 2 pages.

(Continued)

*Primary Examiner* — Dang T Ton
(74) *Attorney, Agent, or Firm* — LEE, HONG, DEGERMAN, KANG & WAIMEY

(57)            ABSTRACT

Disclosed are a method and device for transmitting and receiving a wireless signal in a wireless communication system. A method for transmitting a physical random access channel (PRACH) according to an embodiment disclosed
            (Continued)

INITIAL CELL SEARCH | SYSTEM INFORMATION RECEPTION | RANDOM ACCESS PROCEDURE | GENERAL DL/UL Tx/Rx

PSS/SSS& [DLRS]& PBCH | PDCCH/ PDSCH (BCCH) | PRACH | PDCCH/ PDSCH | PUSCH | PDCCH/ PDSCH | PDCCH/ PDSCH | PUSCH/ PUCCH

S601        S602        S603    S604        S605    S606        S607        S608

· DL/UL ACK/NACK
· UE CQI/PMI RI REPORT
  USING PUSCH AND PUCCH herein comprises the steps of: receiving configuration information related to uplink transmission from a base station; and transmitting the PRSCH to the base station on the basis of the configuration information. The configuration information includes information about the subcarrier spacing (SCS) of the PRACH and information about the SCS of a physical uplink shared channel (PUSCH), and the number of resource blocks (RBs) occupied by the PUSCH can be determined, on the basis of i) the SCS of the PRACH, ii) the SCS of the PUSCH, and iii) the length of the PRACH sequence, as the minimum number of RBs to which a PRACH sequence can be mapped, wherein the number of RBs occupied by the PUSCH is expressed as the number of RBs for the PUSCH.

8 Claims, 19 Drawing Sheets

(51) Int. Cl.
    *H04W 74/0836*     (2024.01)
    *H04W 74/0838*     (2024.01)
(58) Field of Classification Search
    USPC .................................. 370/329, 401, 402, 403
    See application file for complete search history.

(56) References Cited

U.S. PATENT DOCUMENTS

| | | | | |
|---|---|---|---|---|
| 2019/0306832 A1* | 10/2019 | Si | ........................... | H04W 76/15 |
| 2022/0287107 A1* | 9/2022 | Kim | .................. | H04W 72/0453 |
| 2023/0043012 A1 | 2/2023 | Huang et al. | | |

FOREIGN PATENT DOCUMENTS

| | | |
|---|---|---|
| WO | 2020231616 | 11/2020 |
| WO | 2021203374 | 10/2021 |

OTHER PUBLICATIONS

3rd Generation Partnership Project (3GPP), "Technical Specification Group Radio Access Network; NR; Physical channels and modulation (Release 16)," 3GPP TS 38.211 V16.4.0, Dec. 2020, 134 pages.

European Patent Office Application Serial No. 22739719.7, Search Report dated Oct. 24, 2024, 11 pages.

Intel Corporation, "Summary #1 of email discussion on initial access aspect of NR extension up to 71 GHz," 3GPP TSG RAN WG1 Meeting #107-e, R1-2112451, Nov. 2021, 162 pages.

\* cited by examiner

FIG.6

(a) Carrier aggregation between L-band and U-band　　　(b) Standalone U-band(s)

(a)

(b)

(a)

(b)

(a)

One OFDM symbol for timing gap period (b)

One OFDM symbol for timing gap period

METHOD AND DEVICE FOR TRANSMITTING AND RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2022/000654, filed on Jan. 13, 2022, which claims the benefit of earlier filing date and right of priority to Korean Application Nos. 10-2021-0005580, filed on Jan. 14, 2021, 10-2021-0043523, filed on Apr. 2, 2021, and 10-2021-0075361, filed on Jun. 10, 2021, and also claims the benefit of U.S. Provisional Application No. 63/278,519, filed on Nov. 12, 2021, and 63/280,630, filed on Nov. 18, 2021, the contents of which are all incorporated by reference herein in their entirety.

TECHNICAL FIELD

The present disclosure relates to a wireless communication system, and in more detail, relates to a method and an apparatus of transmitting and receiving a wireless signal in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for transmitting and receiving an uplink signal/channel.

In addition, an additional technical object of the present disclosure is to provide a method and an apparatus for configuring an occasion of a physical random access channel (PRACH) and/or a physical uplink channel (PUSCH) in a high frequency band (e.g., 52.6 GHz)

In addition, an additional technical object of the present disclosure is to provide a method and an apparatus for transmitting and receiving a PRACH by mapping a PRACH sequence to a resource within a random access procedure.

The technical objects to be achieved by the present disclosure are not limited to the above-described technical objects, and other technical objects which are not described herein will be clearly understood by those skilled in the pertinent art from the following description.

A method of transmitting a physical random access channel (PRACH) in a wireless communication system according to an aspect of the present disclosure, performed by a user equipment (UE), may include: receiving, from a base station, configuration information related to uplink transmission; and transmitting, to the base station, the PRACH based on the configuration information. The configuration information may include information on subcarrier spacing (SCS) of the PRACH and information on SCS of a physical uplink shared channel (PUSCH), and based on i) the SCS of the PRACH, ii) the SCS of the PUSCH and iii) a length of a PRACH sequence, a number of resource blocks (RBs) occupied by the PRACH, expressed as a number of RBs for the PUSCH, may be determined by a minimum number of RBs to which the PRACH sequence can be mapped.

A method of receiving a physical random access channel (PRACH) in a wireless communication system according to an aspect of the present disclosure, performed by a base station, may include: transmitting, to a user equipment (UE), configuration information related to uplink transmission; and receiving, from the UE, the PRACH based on the configuration information. The configuration information may include information on subcarrier spacing (SCS) of the PRACH and information on SCS of a physical uplink shared channel (PUSCH), and based on i) the SCS of the PRACH, ii) the SCS of the PUSCH and iii) a length of a PRACH sequence, a number of resource blocks (RBs) occupied by the PRACH, expressed as a number of RBs for the PUSCH, may be determined by a minimum number of RBs to which the PRACH sequence can be mapped.

According to an embodiment of the present disclosure, it is possible to minimize latency due to transmission and reception of a PRACH and/or a PUSCH in a high frequency band, and to prevent resource waste due to transmission and reception of a PRACH and/or a PUSCH.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 20 and FIG. 21 are diagrams illustrating PRACH sequence mapping according to an embodiment of the present disclosure.

FIG. 25 illustrates a block diagram of a wireless communication device according to an embodiment of the present disclosure.

DETAILED DESCRIPTION

Figure 1:
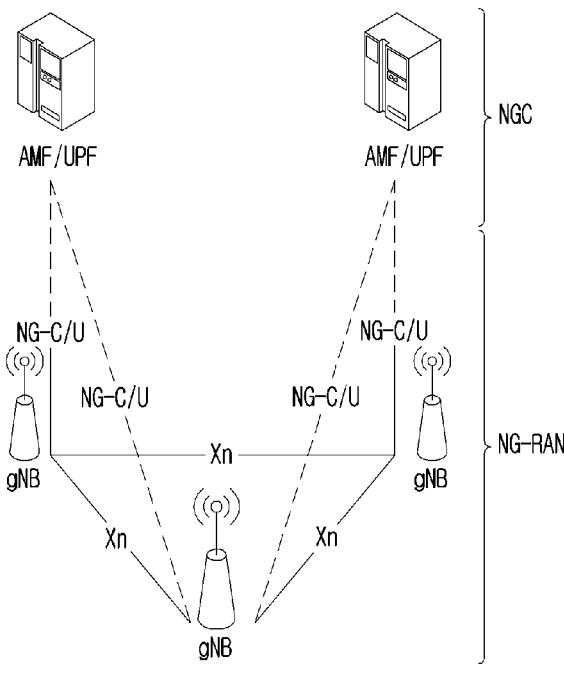
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS(Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/ LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
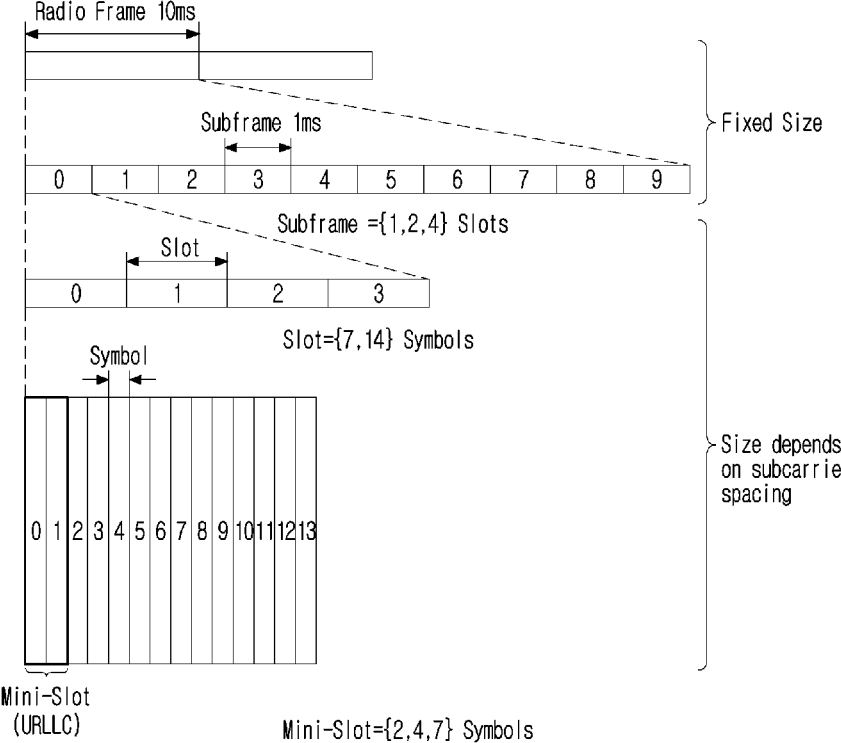
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^{\mu} \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 KHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480-103 Hz and $N_f$ is 4096. Downlink and uplink transmission is configured (organized) with a radio frame having a duration of $T_f=1/(\Delta f_{max}N_f/100) \cdot T_c=10$ ms. Here, a radio frame is configured with 10 subframes having a duration of $T_{sf}=(\Delta f_{max}N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration u, slots are numbered in an increasing order of $n_s^{\mu} \in \{0, \dots, N_{slot}^{subframe,\mu}-1\}$ in a subframe and are numbered in an increasing order of $n_{s,f}^{\mu} \in \{0, \dots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^{\mu}$ in a subframe is temporally arranged with a start of an OFDM symbol $n_s^{\mu}N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
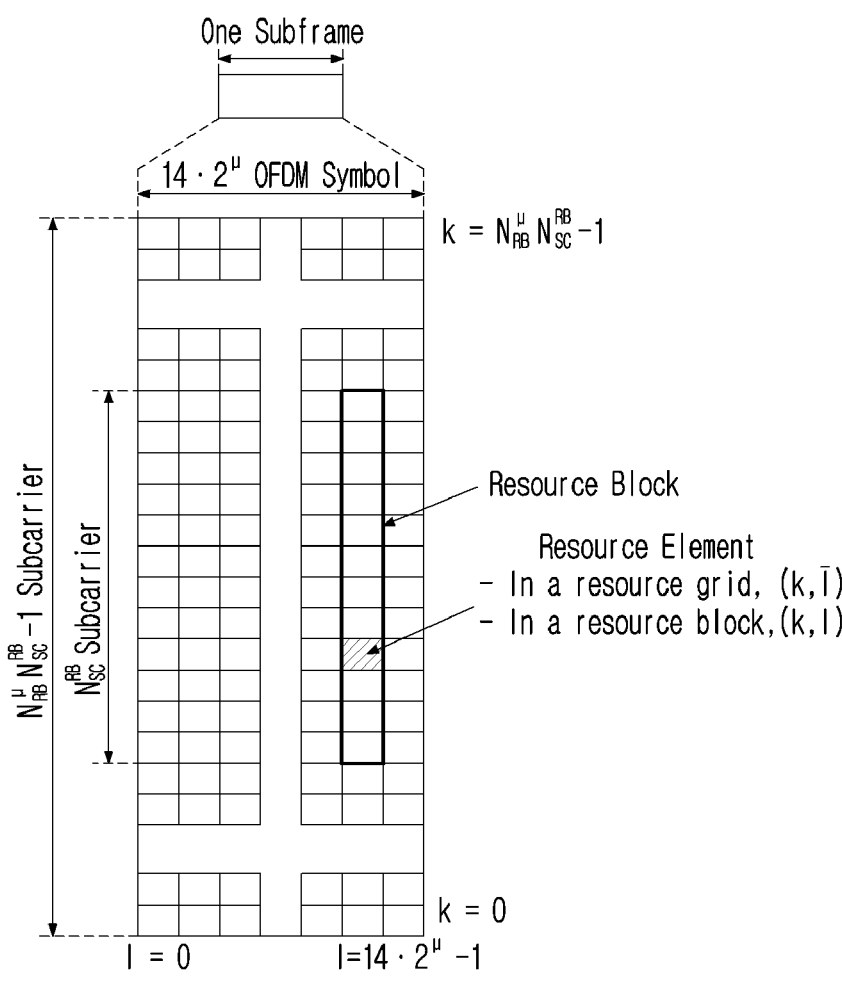
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with $14 \cdot 2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0 \dots, N_{RB}^{\mu}N_{sc}^{RB}-1$ is an index in a frequency domain and $l'=0, \dots, 2^{\mu}N_{symb}^{(\mu)}-1$ refers to a position of a symbol in a subframe. When referring to a resource element in a slot, an index pair (k,l) is used. Here, $l=0, \dots, N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequency PointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration u is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
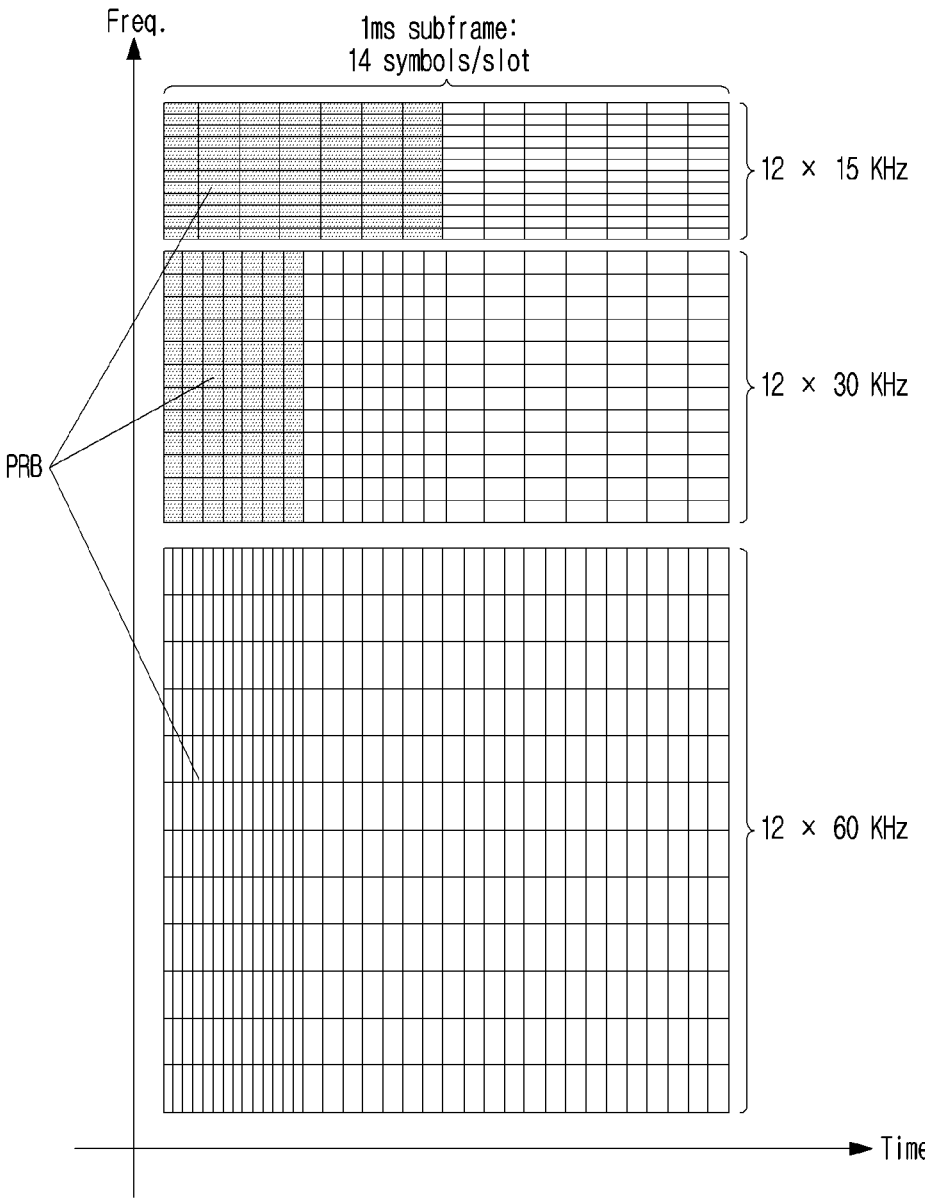
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
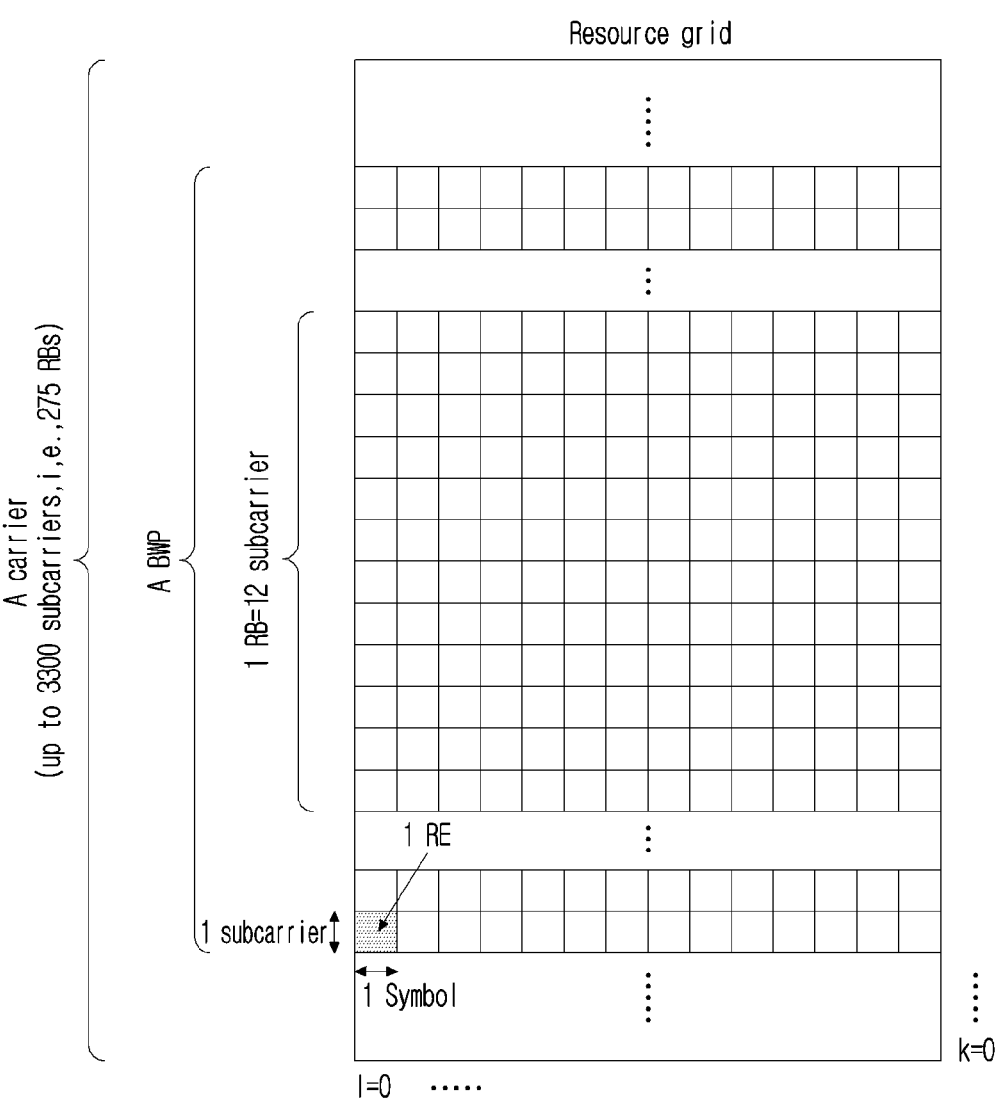
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
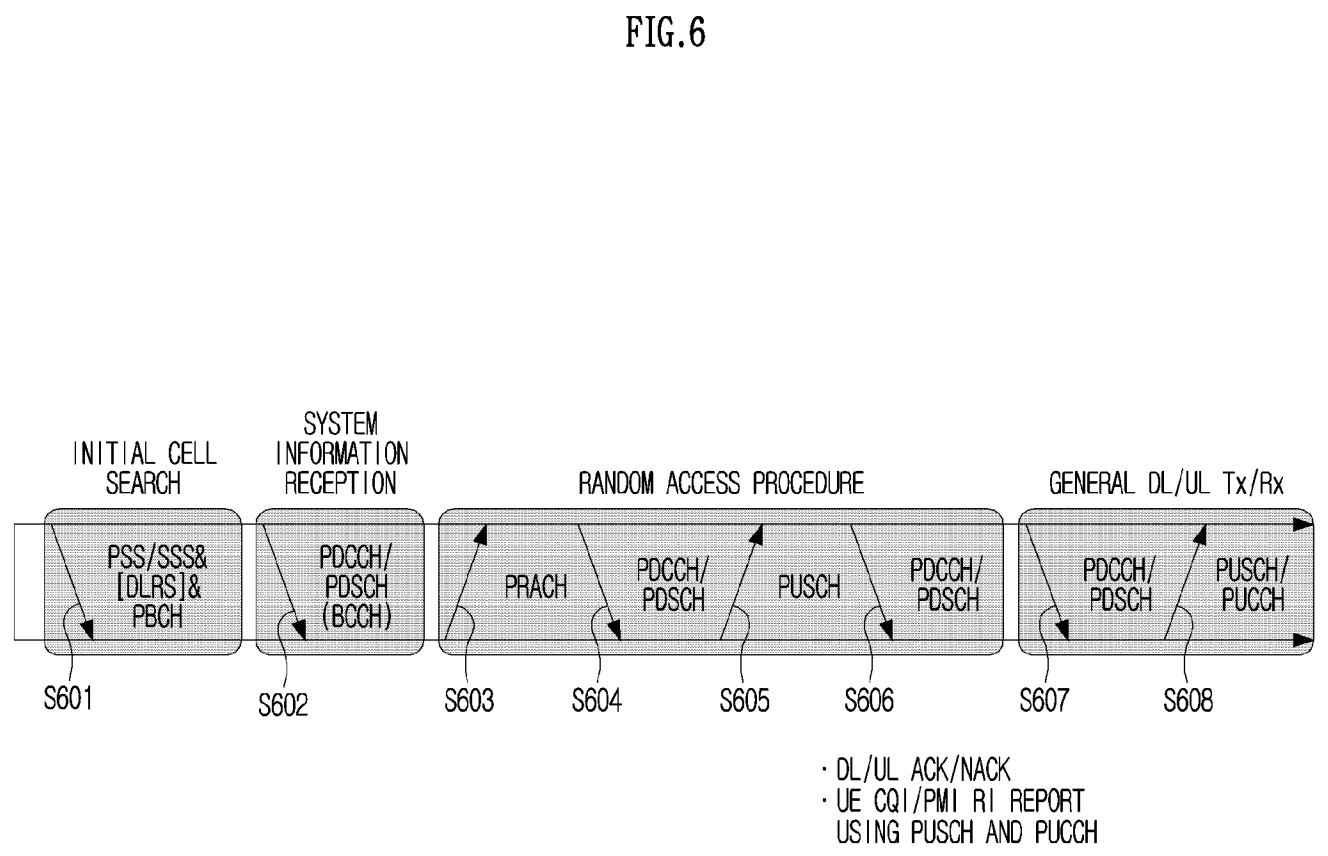

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check)

scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL (quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured at list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS (demodulation reference signal) of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A QCL type corresponding to each DL RS is given by a higher layer parameter qcl-Type of QCL-Info and may take one of the following values.

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

For example, when a target antenna port is a specific NZP CSI-RS, it may be indicated/configured that a corresponding NZP CSI-RS antenna port is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Wireless Communication System Supporting an Unlicensed Band

Figure 7:
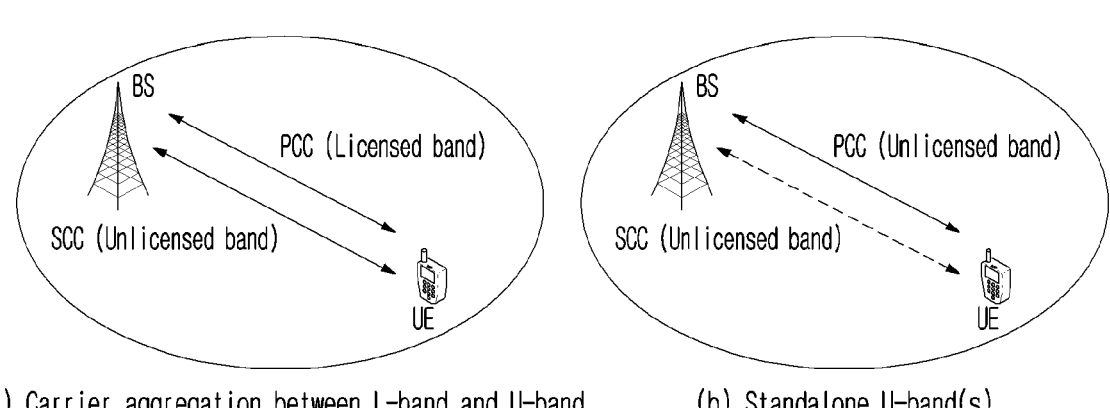
FIG. 7 illustrates a wireless communication system supporting an unlicensed band.

FIG. 7 illustrates a wireless communication system supporting an unlicensed band. For convenience, a cell operating in a licensed band (hereinafter, L-band) is defined as an LCell, and a carrier of the LCell is defined as a (DL/UL) Licensed Component Carrier (LCC). In addition, a cell operating in an unlicensed band (hereinafter, U-band) is defined as a UCell, and a carrier of the UCell is defined as an (DL/UL) Unlicensed Component Carrier (UCC). A carrier of a cell may mean an operating frequency (e.g., a center frequency) of the cell. A cell/carrier (e.g., Component Carrier, CC) may be referred to as a cell.

When carrier aggregation (CA) is supported, one UE may transmit/receive a signal to/from a base station through a plurality of aggregated cells/carriers. When a plurality of CCs are configured for one UE, one CC may be configured as a PCC (Primary CC), and the remaining CCs may be configured as SCCs (Secondary CC). Specific control information/channel (e.g., CSS PDCCH, PUCCH) may be configured to be transmitted/received only through a PCC. Data may be transmitted and received through a PCC/SCC. FIG. 7(a) illustrates a case in which a UE and a base station transmit and receive signals through an LCC and a UCC (non-standalone (NSA) mode). In this case, an LCC may be configured to a PCC and a UCC may be configured to a SCC. When a plurality of LCCs are configured in a UE, one specific LCC may be configured as a PCC and the remaining LCCs may be configured as SCCs. FIG. 7(a) corresponds to LAA of a 3GPP LTE system. FIG. 7(b) illustrates a case in which a UE and a base station transmit and receive signals through one or more UCCs without any LCC (standalone mode (SA)). In this case, one of the UCCs may be configured as a PCC and the other UCCs may be configured as SCCs. Accordingly, PUCCH, PUSCH, PRACH transmission, etc. may be supported in a NR UCell. In an unlicensed band of a 3GPP NR system, both an NSA mode and an SA mode may be supported.

A radio frame structure for an unlicensed band is described.

A frame type 3 of LTE or NR frame structure may be used for an operation in an unlicensed band. A configuration of OFDM symbols occupied for uplink/downlink signal transmission in a frame structure for an unlicensed band may be configured by a base station. Here, an OFDM symbol may be substituted with an SC-FDM(A) symbol.

For downlink signal transmission through an unlicensed band, a base station may inform a UE of a configuration of OFDM symbols used in subframe #n through signaling. Here, a subframe may be substituted with a slot or a time unit (TU).

Specifically, in a case of an LTE system supporting an unlicensed band, a UE may assume (or identify) a configuration of an OFDM symbol occupied in subframe #n through a specific field (e.g., Subframe configuration for LAA field, etc.) DCI received from a base station in subframe #n−1 or subframe #n.

Table 6 illustrates a method in which the Subframe configuration for LAA field represents a configuration of OFDM symbols used for transmission of a downlink physical channel and/or physical signal in a current and/or next subframe in an LTE system.

TABLE 6

| Value of 'Subframe configuration for LAA' field in current subframe | Configuration of occupied OFDM symbols (current subframe, next subframe) |
|---|---|
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

(—, Y) means that a UE can assume that the first Y symbols in the next subframe are occupied and the other symbols in the next subframe are not occupied.
(X, —) means that a UE can assume that the first X symbols in the current subframe are occupied and the other symbols in the current subframe are not occupied.
(X, *) means that a UE can assume that the first X symbols in the current subframe are occupied and at least the first OFDM symbol of the next subframe is not occupied.

In order to transmit an uplink signal through an unlicensed band, a base station may inform a UE of information on an uplink transmission period through signaling.

Specifically, in a case of an LTE system supporting an unlicensed band, a UE may obtain 'UL duration' and 'UL offset' information for subframe #n through the 'UL duration and offset' field in the detected DCI.

Table 7 illustrates a method in which the UL duration and offset field represents configuration of a UL offset and a UL duration in an LTE system.

TABLE 7

| Value of 'UL duration and offset' field | UL offset, l (in subframes) | UL duration, d (in subframes) |
|---|---|---|
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |

TABLE 7-continued

| Value of 'UL duration and offset' field | UL offset, l (in subframes) | UL duration, d (in subframes) |
|---|---|---|
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

As an example, when the UL duration and offset field configures (or indicates) UL offset 1 and UL duration d for subframe #n, a UE does not need to receive a downlink physical channel and/or a physical signal within subframe #n+1+i (i=0, 1, . . . , d−1). A downlink signal transmission method through an unlicensed band is described.

A base station may perform one of the following unlicensed band access procedures (e.g., Channel Access Procedure, CAP) for downlink signal transmission in an unlicensed band.

(1) A First Downlink CAP Method

Figure 8:
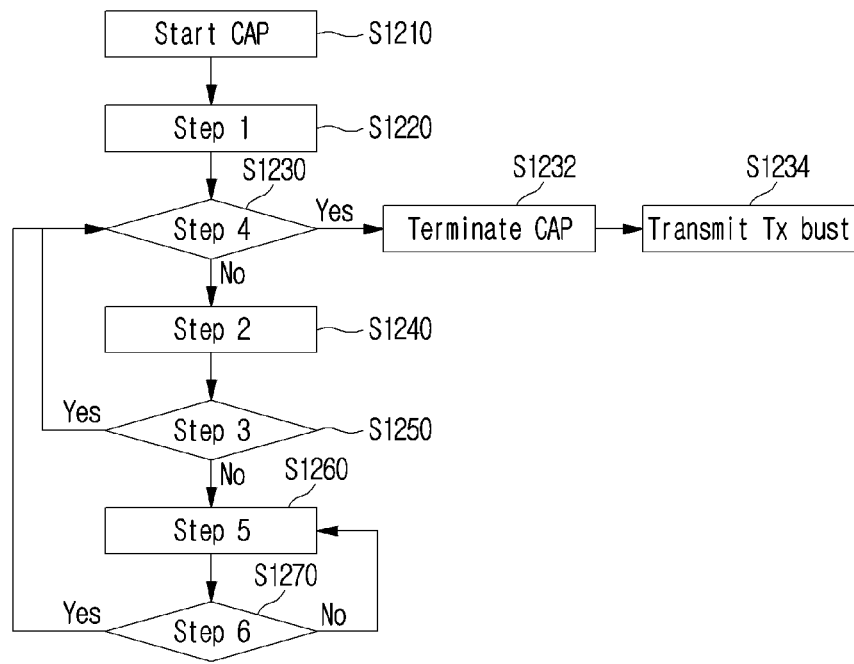
FIG. 8 is a flowchart of a CAP operation for downlink signal transmission through an unlicensed band of a base station.

FIG. 8 a flowchart of a CAP operation for downlink signal transmission through an unlicensed band of a base station.

A base station may initiate a channel access procedure (CAP) for downlink signal transmission (e.g., signal transmission including a PDSCH/PDCCH/EPDCCH) through an unlicensed band (S1210). A base station may randomly select a backoff counter N within a contention window (CW) according to step 1. Here, an N value is set to an initial value $N_{init}$ (S1220). $N_{init}$ is selected as a random value among values between 0 and $CW_p$. Subsequently, if a backoff counter value (N) is 0 according to step 4 (S1230; Y), a base station terminates a CAP process (S1232). Subsequently, a base station may perform Tx burst transmission including a PDSCH/PDCCH/EPDCCH (S1234). On the other hand, if a backoff counter value is not 0 (S1230; N), a base station decreases a backoff counter value by 1 according to step 2 (S1240). Next, a base station checks whether a channel of a U-cell(s) is in an idle state (S1250), and if a channel is in an idle state (S1250; Y), checks whether a backoff counter value is 0 (S1230). On the other hand, if a channel is not in an idle state in step S1250, that is, if a channel is in a busy state (S1250; N), a base station checks whether a corresponding channel is in an idle state for a defer duration (Td: 25 usec or more) longer than a slot time (e.g., 9 usec) according to step 5 (S1260). If a channel is in an idle state during a defer duration (S1270; Y), a base station may resume a CAP process again. Here, a defer duration may be composed of a 16 usec duration and immediately following $m_p$ consecutive slot times (e.g., 9 usec). On the other hand, if a channel is in a busy state during a defer duration (S1270;

N), a base station re-performs step S1260 to check again whether a channel of a U-cell(s) is in an idle state during a new defer duration.

Table 8 illustrates that $m_p$, minimum CW, maximum CW, maximum channel occupancy time (MCOT) and allowed CW sizes applied to a CAP vary according to a channel access priority class (p).

TABLE 8

| Channel Access Priority Class (p) | $m_p$ | $CW_{min,p}$ | $CW_{max,p}$ | $T_{m\ cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A contention window size applied to a first downlink CAP may be determined based on various methods. For example, a contention window size may be adjusted based on a probability that HARQ-ACK values corresponding to PDSCH transmission(s) in a certain time interval (e.g., reference TU) are determined as NACK. When a base station performs downlink signal transmission including a PDSCH related to a channel access priority class p on a carrier, if a probability that HARQ-ACK values corresponding to PDSCH transmission(s) in reference subframe k (or reference slot k) is determined as NACK is at least Z=80%, a base station increases CW values configured for each priority class to the allowed next higher values, respectively. Alternatively, a base station maintains CW values configured for each priority class as initial values. A reference subframe (or reference slot) may be defined as a start subframe (or start slot) in which the most recent signal transmission on a corresponding carrier for which at least some HARQ-ACK feedback is available is performed.

(2) A Second Downlink CAP Method

A base station may perform downlink signal transmission (e.g., signal transmission including discovery signal transmission and not including a PDSCH) through an unlicensed band based on a second downlink CAP method described later.

When a length of a signal transmission period of a base station is 1 ms or less, the base station may transmit a downlink signal (e.g., a signal that includes discovery signal transmission and does not include a PDSCH) through an unlicensed band immediately after a corresponding channel is sensed as idle for at least a sensing period $T_{drs}$=25 us. Here, $T_{drs}$ is composed of an interval $T_f$ (=16 us) immediately following one slot interval $T_{si}$=9 us.

(3) A Third Downlink CAP Method

A base station may perform a following CAP for downlink signal transmission through multiple carriers in an unlicensed band.

1) Type A: A base station performs a CAP for multi-carriers based on a counter N (a counter N considered in a CAP) defined for each carrier, and transmits a downlink signal based on this.

Type A1: A counter N for each carrier is determined independently of each other, and downlink signal transmission through each carrier is performed based on a counter N for each carrier.

Type A2: A counter N for each carrier is determined as an N value for a carrier having the largest contention window size, and downlink signal transmission through a carrier is performed based on a counter N for each carrier.

2) Type B: A base station performs a CAP based on a counter N only for a specific carrier among a plurality of carriers, and prior to signal transmission on a specific carrier, a base station determines whether channels of the remaining carriers are idle and transmits a downlink signal.

Type B1: A single contention window size is defined for a plurality of carriers, and a base station utilizes a single contention window size when performing a CAP based on a counter N for a specific carrier.

Type B2: A contention window size is defined for each carrier, and when determining a $N_{init}$ value for a specific carrier, the largest contention window size among contention window sizes is used.

A method for transmitting an uplink signal through an unlicensed band is described.

A UE performs a contention-based CAP for transmission of an uplink signal in an unlicensed band. A UE performs a Type 1 or Type 2 CAP for uplink signal transmission in an unlicensed band. In general, a UE may perform a CAP (e.g., Type 1 or Type 2) configured by a base station for uplink signal transmission.

(1) Type 1 Uplink CAP Method

Figure 9:
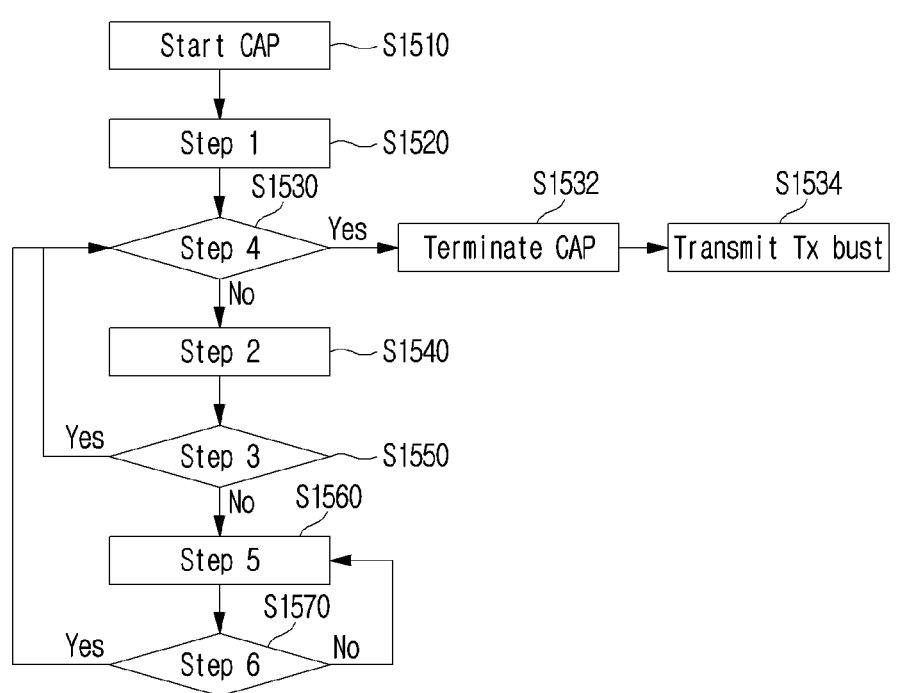
FIG. 9 is a flow chart of Type 1 CAP operation of a UE for uplink signal transmission.

FIG. 9 is a flow chart of Type 1 CAP operation of a UE for uplink signal transmission.

A UE may initiate a CAP for signal transmission through an unlicensed band (S1510). A UE may arbitrarily select a backoff counter N within a contention window (CW) according to step 1. Here, a value of N is configured to an initial value $N_{init}$ (S1520). $N_{init}$ is selected to be any value between 0 and $CW_p$. Then, according to step 4, if a backoff counter value (N) is 0 (S1530; Y), a UE ends a CAP process (S1532). Thereafter, a UE may perform Tx burst transmission (S1534). On the other hand, if a backoff counter value is not 0 (S1530; N), a UE decreases a backoff counter value by 1 according to step 2 (S1540). Thereafter, a UE checks whether a channel of a UCell(s) is in an idle state (S1550), and if a channel is in an idle state (S1550; Y), checks whether a backoff counter value is 0 (S1530). On the other hand, if a channel is not in an idle state in step S1550, that is, if a channel is in a busy state (S1550; N), a UE checks whether a corresponding channel is in an idle state for a delay period (defer duration Td; 25 usec or more) longer than a slot time (e.g., 9 us) according to step 5 (S1560). If a channel is in an idle state during a delay period (S1570; Y), a UE may resume a CAP process again. Here, a delay period may include a 16 usec period and $m_p$ consecutive slot times (e.g., 9 us) immediately following it. On the other hand, if a channel is in a busy state during a delay period (S1570; N), a UE re-performs step S1560 to check again whether a channel is in an idle state during a new delay period.

Table 9 shows $m_p$, minimum CW ($CW_{min,p}$), maximum CW ($CW_{max,p}$), maximum channel occupancy time (MCOT, $T_{ulmcot,p}$) applied to a CAP according to a channel access priority class (p).

TABLE 9

| Channel Access Priority Class (p) | $m_p$ | $CW_{min, p}$ | $CW_{max, p}$ | $T_{ulm cot, p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |

TABLE 9-continued

| Channel Access Priority Class (p) | $m_p$ | $CW_{min, p}$ | $CW_{max, p}$ | $T_{ulm cot, p}$ | allowed $CW_p$ sizes |
|---|---|---|---|---|---|
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

A CW size (CWS) applied to a Type 1 CAP may be determined based on various methods. As an example, a CWS may be adjusted based on whether to toggle a New Data Indicator (NDI) value for at least one HARQ processor related to HARQ_ID_ref, which is a HARQ process ID of a UL-SCH within a predetermined time duration (e.g., reference TU). When a UE performs signal transmission using a Type 1 CAP related to a channel access priority class p on a carrier, if an NDI value for at least one HARQ process related to HARQ_ID_ref is toggled, the UE sets $CW_p=CW_{min,p}$ in all priority classes p∈{1,2,3,4}, and if not, the UE increases $CW_p$ to the next higher allowed value in all priority classes p∈{1,2,3,4}.

The reference subframe $n_{ref}$ (or reference slot $n_{ref}$) is determined as follows.

When a UE receives a UL grant in a subframe (or slot) ng and performs transmission including a UL-SCH without a gap starting from a subframe (or slot) no in subframes (or slots) $n_0$, $n_1$, . . . , $n_w$, a reference subframe (or slot) $n_{ref}$ is a subframe (or slot) no.

(2) Type 2 Uplink CAP Method

If it is sensed that a channel is idle for at least a sensing period $T_{short\_ul}$=25 us, a UE may perform uplink transmission (e.g., PUSCH) in an unlicensed band immediately after the sensing is terminated. $T_f$ includes an idle slot period $T_{sl}$ at the start point of the $T_f$.

Random Access Procedure

Figure 10:
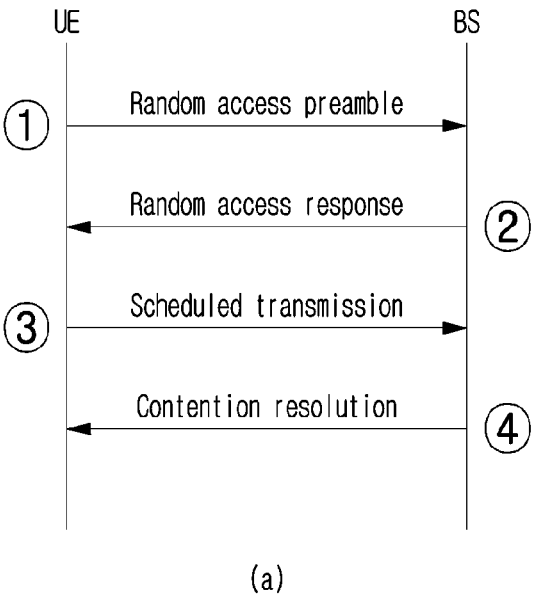
FIG. 10 illustrates a random access procedure in a wireless communication system to which the present disclosure may be applied.
Figure 10:
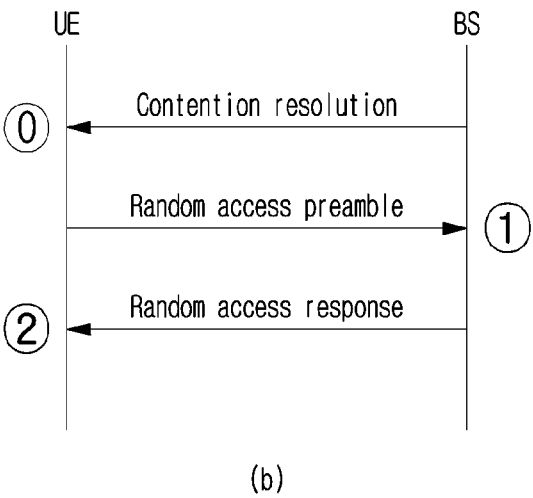

FIG. 10 illustrates a random access procedure in a wireless communication system to which the present disclosure may be applied. FIG. 10(*a*) illustrates a contention-based random access procedure, and FIG. 10(*b*) illustrates a dedicated random access procedure.

Referring to FIG. 10(*a*), a contention-based random access process includes the following four steps. Hereinafter, messages transmitted in steps 1 to 4 may be referred to as messages (Msg) 1 to 4, respectively.

Step 1: A terminal transmits a random access channel (RACH) preamble through a physical random access channel (PRACH).

Step 2: A terminal receives a random access response (RAR) through a downlink shared channel (DL-SCH) from a base station.

Step 3: A terminal transmits a Layer 2/Layer 3 message to a base station through an uplink shared channel (UL-SCH).

Step 4: A terminal receives a contention resolution message from a base station through a DL-SCH.

A terminal may receive information on a random access from a base station through system information.

If a random access is required, a terminal transmits a RACH preamble to a base station as in step 1. A base station may distinguish each random access preamble through a time/frequency resource (i.e., RACH Occasion (RO)) and a random access preamble index (PI) in which a random access preamble is transmitted.

When a base station receives a random access preamble from a terminal, the base station transmits a random access response (RAR) message to the terminal as in step 2. For reception of a random access response message, within a preconfigured time window (e.g., ra-ResponseWindow), a terminal monitors a CRC-masked L1/L2 control channel (PDCCH) with a RA-RNTI (Random Access-RNTI) including scheduling information for the random access response message. A PDCCH masked with a RA-RNTI may be transmitted only through a common search space. When receiving a scheduling signal masked by a RA-RNTI, a terminal may receive a random access response message from a PDSCH indicated by the scheduling information. Thereafter, a terminal checks whether there is random access response information indicated to itself in the random access response message. Whether or not random access response information indicated to itself exists may be checked by whether a random access preamble ID (RAPID) for a preamble transmitted by the terminal exists. An index of a preamble transmitted by a terminal and a RAPID may be the same. Random access response information includes a corresponding random access preamble index, timing offset information for UL synchronization (e.g., Timing Advance Command (TAC)), UL scheduling information for message 3 transmission (e.g., UL grant) and terminal temporary identification information (e.g., TC-RNTI (Temporary-C-RNTI)).

A terminal receiving random access response information transmits UL-SCH (Shared Channel) data (message 3) through a PUSCH according to L scheduling information and a timing offset value, as in step 3. Message 3 may include an ID of a terminal (or a global ID of a terminal). Alternatively, message 3 may include RRC connection request related information (e.g., RRCSetupRequest message) for initial access. In addition, message 3 may include a buffer status report (BSR) on an amount of data available for transmission by a terminal.

After receiving UL-SCH data, as in step 4, a base station transmits a contention resolution message (message 4) to a terminal. When a terminal receives a contention resolution message and a contention is resolved successfully, a TC-RNTI is changed to a C-RNTI. Message 4 may include an ID of a terminal and/or RRC connection related information (e.g., an RRCSetup message). If information transmitted through message 3 and information received through message 4 do not match, or if message 4 is not received for a certain duration of time, a terminal may retransmit message 3 as a contention resolution has failed.

Referring to FIG. 10(*b*), a dedicated random access process includes the following three steps. Hereinafter, messages transmitted in steps 0 to 2 may be referred to as messages (Msg) 0 to 2, respectively. A dedicated random access procedure may be triggered using a PDCCH (hereinafter referred to as a PDCCH order) for which a base station instructs to transmit a RACH preamble.

Step 0: A base station allocates a RACH preamble through dedicated signaling to a terminal.

Step 1: A terminal transmits a RACH preamble through a PRACH.

Step 2: A terminal receives a random access response (RAR) through a DL-SCH from a base station.

The operations of steps 1 and 2 of a dedicated random access procedure may be the same as steps 1 and 2 of a contention-based random access procedure.

In NR, DCI format 1_0 is used to initiate a non-contention-based random access procedure with a PDCCH order. DCI format 1_0 is used to schedule a PDSCH in one DL cell.

Meanwhile, when a CRC (Cyclic Redundancy Check) of DCI format 1_0 is scrambled with a C-RNTI and all bit values of the "Frequency domain resource assignment" field are 1, DCI format 1_0 is used as a PDCCH order indicating a random access procedure. do. In this case, fields of DCI format 1_0 are configured as follows.

RA preamble index: 6 bits

UL/SUL (Supplementary UL) indicator: 1 bit. When bit values of a RA preamble index are not all 0 and SUL is configured in a cell for a terminal, it indicates a UL carrier on which a PRACH is transmitted in a cell. Otherwise, it is reserved.

SSB (Synchronization Signal/Physical Broadcast Channel) index: 6 bits. When all bit values of a RA preamble index are not 0, it indicates an SSB used to determine a RACH opportunity for PRACH transmission. Otherwise, it is reserved.

PRACH mask index: 4 bits. When all bit values of a RA preamble index are not 0, it indicates a RACH opportunity associated with an SSB indicated by an SSB index. Otherwise, it is reserved.

Reserved: 10 bits

When DCI format 1_0 does not correspond to a PDCCH order, DCI format 1_0 includes fields used to schedule a PDSCH (e.g., TDRA (Time domain resource assignment), MCS (Modulation and Coding Scheme), HARQ process number, PDSCH-to-HARQ_feedback timing indicator, etc.).

In the NR system, lower latency than the existing system may be required. In addition, if a random access process occurs in an U-band, the random access process is terminated and contention is resolved only when a terminal and a base station sequentially succeed in an LBT in both a 4-step random access process. If an LBT fails in even one step of a 4-step random access process, resource efficiency decreases and latency increases. Specifically, if an LBT fails in a scheduling/transmission process associated with message 2 or message 3, a decrease in resource efficiency and an increase in latency may occur significantly. Even a random access process in an L-band may require a low-latency random access process in various scenarios of an NR system. Accordingly, a 2-step random access procedure may be performed on an L-band as well.

Figure 11:
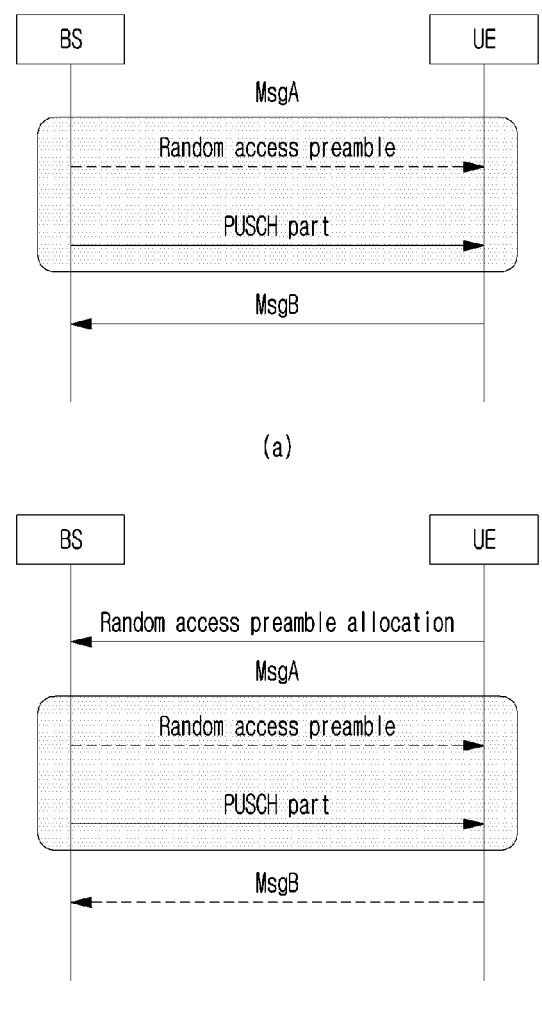
FIG. 11 illustrates a two-step random access process in a wireless communication system to which the present disclosure may be applied.

FIG. 11 illustrates a two-step random access process in a wireless communication system to which the present disclosure may be applied.

As shown in FIG. 11(*a*), a 2-step random access process may be configured in two steps of uplink signal transmission (referred to as message A) from a terminal to a base station and downlink signal transmission (referred to as message B) from a base station to a terminal.

In addition, in a non-contention random access process, a random access preamble and a PUSCH part may be transmitted together as shown in FIG. 11(*b*).

Although not shown in FIG. 11, a PDCCH for scheduling message B may be transmitted from a base station to a terminal, which may be referred to as Msg. B PDCCH.

Method for Transmitting and Receiving Wireless Signals

The above-described contents may be applied in combination with methods proposed in the present disclosure to be described later, or may be supplemented to clarify technical characteristics of the methods proposed in the present disclosure.

In addition, methods related to configuration of a PRACH transmission occasion to be described later are related to uplink transmission may be equivalently applied to an uplink signal transmission method in the NR system (licensed band) or U-Band system (unlicensed band) described above. In addition, the technical features proposed in the present disclosure can be modified or replaced to suit terms, expressions, structures, etc. defined in each system so that they can be implemented in the corresponding system.

For example, uplink transmission through methods related to configuration of a PRACH transmission occasion to be described later may be performed in an L-cell and/or a U-cell defined in a NR system or a U-Band system.

As more and more communication devices require greater communication capacity, efficient use of a limited frequency band in a next-generation wireless communication system becomes an increasingly important requirement. Cellular communication systems such as LTE/NR systems are also considering ways to utilize unlicensed bands for traffic offloading such as the 2.4 GHz band mainly used by the existing WiFi system or the newly emerging 5/6 GHz and 60 GHz bands. Basically, since the unlicensed band assumes a method of wireless transmission and reception through competition between each communication node, it is required that each communication node perform channel sensing before transmitting a signal to confirm that another communication node is not transmitting a signal. For convenience, this operation is called listen before talk (LBT) or channel access procedure (CAP). In particular, carrier sensing (CS) is defined as an operation determining whether another communication node is transmitting a signal, and clear channel assessment (CCA) is defined as confirming that another communication node is not transmitting a signal. An eNB (or gNB or base station) or UE of an LTE/NR system should also perform LBT for signal transmission in an unlicensed band (referred to as U-band for convenience, may also be referred to as a shared spectrum). When an eNB or UE of the LTE/NR system transmits a signal, other communication nodes such as WiFi should also perform LBT so as not to cause interference. For example, in the WiFi standard (801.11ac), the CCA threshold is specified as −62 dBm for non-WiFi signals and −82 dBm for WiFi signals. This means that a station (STA) or an access point (AP), for example, does not transmit a signal so as not to cause interference when a signal other than WiFi is received with a power of −62 dBm or more.

NR supports a number of numerologies (or subcarrier spacing (SCS)) for supporting various 5G services. For example, when SCS is 15 kHz, it supports a wide area in traditional cellular bands, and when SCS is 30 KHz/60 kHz, it supports dense-urban, lower latency and wider carrier bandwidth, and when SCS is 60 kHz or higher, bandwidths greater than 24.25 GHz are supported to overcome phase noise.

The NR frequency band is defined as two types of frequency ranges (FR1 and FR2). FR1 and FR2 may be configured as shown in Table 10 below. Also, FR2 may mean millimeter wave (mmW).

TABLE 1

| Frequency Range Designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Bands (e.g., 52.6 GHz to 114.25 GHz band, specifically 71 GHZ) (may be referred to as FR4, etc.) higher than the above-mentioned frequency bands can also be used as unlicensed bands (or shared spectrum).

Meanwhile, in an unlicensed band operation, a method in which it is checked whether a channel to be transmitted is idle or busy, when it is idle, transmission is performed, and when it is busy, it is waited until the next idle state. This operation is referred to as a channel access scheme (i.e., LBT), and a total of four LBT categories are described in TR 38.889 as follows.

Channel access schemes for NR-based access in unlicensed spectrum can be classified into the following categories:

i) Category 1: immediate transmission after a short switching gap

This is used for transmitters that transmit immediately after a switching gap in COT.

A switching gap from reception to transmission is to accommodate a turnaround time of a transceiver and is less than 16 us.

ii) Category 2: LBT without random back-off

A duration of time during which a channel is detected as idle before a transmitting entity transmits is deterministic.

iii) Category 3: LBT using random back-off with a fixed size contention window

As one of the components of the LBT procedure, there is the following procedure. A transmission entity determines an arbitrary value N within a contention window. A size of a contention window is specified by minimum and maximum values of N. A size of a contention window is fixed. An arbitrary value N is used in an LBT procedure to determine a duration of time that a channel is detected as idle before a transmission entity transmits over a channel.

iv) Category 4: LBT using random back-off using a variable-sized contention window An LBT procedure includes the following as one of its components. A transmitting entity determines an arbitrary value N within a contention window. A size of a contention window is specified by minimum and maximum values of N. A transmitting entity may change a size of a contention window when determining an arbitrary value N. An arbitrary value N is used in an LBT procedure to determine a duration of time that a channel is detected as idle before a transmitting entity transmits over a channel.

Here, in the category 3 LBT and category 4 LBT, a back off counter value (i.e., N) is randomly selected and used within a contention window. Here, in category 3 LBT, a back off counter value is always randomly selected based on a fixed contention window size (CWS) value, whereas in category 3 LBT, a CWS value starts from the first minimum CWS value and whenever LBT fails, a CWS value is increased by 1 step within allowed candidates. Here, maximum and minimum values of a CWS and allowed candidate CWS values may be predefined for each channel access priority class.

Comparison of the current FR4 area (i.e., beyond 52.6 GHZ) band regulation and the 5 GHz area can be summarized as follows.

Table 11 is a table comparing European Union (EU) regulations in the 60 GHz band (ETSI EN 302 567) and the 5 GHz band (ETSI EN 301 893).

TABLE 11

| Requirements | 5 GHz (5.15-5.35 GHz and 5.47-5.725 GHz) | 60 GHz band (57-66 GHz) |
|---|---|---|
| Equipment type | LBE / FBE | LBE |
| Supported LBT type | Cat-1, 2, 4 | Cat-3 |
| Max average EIRP (effective isotropic radiated power) and PSD (power spectral density) | 23 dBm and 10 dBm/MHz for 5.15-5.35 GHz, 30 dBm and 17 dBm/MHz for 5.47-5.7525 GHz | 40 dBm and 13 dBm/MHz |
| COT (channel occupancy time) | According to priority class | less than 9 ms |
| Max CWS (contention window size) | According to priority class | 127 |
| NCB (Nominal channel bandwidth) | 20 MHz | Declaration by manufacturer |
| OCB (Occupied channel bandwidth) | 80% and 100% of nominal channel bandwidth | 70% and 100% of declared nominal channel bandwidth |
| Minimum OCB during COT | 2 MHz | — |
| ED (energy detection) threshold | −72 dBm | −47 dBm + (40 dBm − $P_{out}$) |
| CCA slot duration | 9 us | 5 us |
| CCA check time | 16 + m × 9 us | 8 + m × 5 us |

Additionally, comparing WIFI and WiGig can be summarized as follows.

Table 12 is a table comparing Wi-Fi (802.11n/ac/ax) and WiGig (802.11ad/ay).

TABLE 12

| | Wi-Fi (e.g., 802.11n/ac/ax) | WiGig (e.g., 802.11ad/ay) |
|---|---|---|
| Max COT | According to priority class | Up to 8 ms EDCA Parameter Set Element Parameter |
| NCB | 20 MHz | 2.16 GHz |
| LBT types | Cat-1, 2, 4 (Omni-directional) | Cat-1, 2, 4 (Omni-directional) |
| ED threshold | −82 dBm for preamble detection | −68 dBm for preamble detection |
| | −62 dBm for energy detection | −48 dBm for energy detection |
| LBT gap duration | 16 us for Cat-1 LBT | 3 us for Cat-1 LBT |
| | 25 us for Cat-2 LBT | 13 us for Cat-2 LBT |
| PHY parameter | | |
| | Value (802.11ad/ay) | Value (802.11 ac/ax) |
| aSIFSTime | 16 us | 3 us |
| aRxTxTurnaroundTime | <2 us | <1 us |
| aCCATime | <4 us | <3 us |
| aRxTxSwitchTime | <<1 us | <1 us |
| aAirPropagationTime | <<1 us | <100 ns |
| aSlotTime | 9 us | 5 us |
| aCWmin | 15 | 15 |
| aCWmax | 1023 | 1023 |

As an example, for a time when a UE needs to check whether a channel is idle for PRACH preamble (i.e., Msg. 1 preamble) or Msg. A preamble (or Msg. A PUSCH) transmission in the 60 GHz band, once it is confirmed that a channel is idle by $8+5 \times m_p$ (usec), then it is requested to continuously check whether it is idle by K×5 (usec). If busy is detected in the middle, a transmitter can check again whether it is idle as much as $8+5 \times m_p$ (usec) after a certain amount of time has passed, and can continuously check whether it is idle as much as K×5 (usec). Finally, a transmitter repeats the above operation until a back-off counter becomes zero. For example, similar to NR-U, assuming that a channel access priority class is 1, $m_p$ may be 2, and CWS may be 3 or 7. (This value is an NR-U target value and can be changed in FR4)

Embodiment 1: Time Gap Between RACH (Random Access Channel) Occasions and PUSCH Occasions in a Random Access Channel (RACH) Slot Introducing a timing gap duration between adjacent RACH occasions (RO) (i.e., for Msg. 1 preamble and/or Msg. A preamble) and/or between PUSCH occasions (PO)

for existing NR-Us has been discussed, but not actually introduced. However, such technology can be additionally discussed in the FR4 region, and a required timing gap duration between actual ROs and/or POs can be defined/proposed according to an SCS value that can be supported in the FR4 region as follows.

Embodiment 1-1: Method for Configuring Timing Gap Duration According to SCS Value As a first method, a timing gap duration may be defined at an OFDM symbol level between ROs and/or POs. For example, an SCS values considered in the FR4 region are {120, 240, 480, 960} kHz, and a single OFDM symbol length for each SCS is {8.92, 4.46, 2.23, 1.15} usec (here, a duration of a single OFDM symbol (+single normal CP) can be calculated using $(144+2024)\kappa \times 2^{\mu}$ according to an SCS value).

Figure 12:
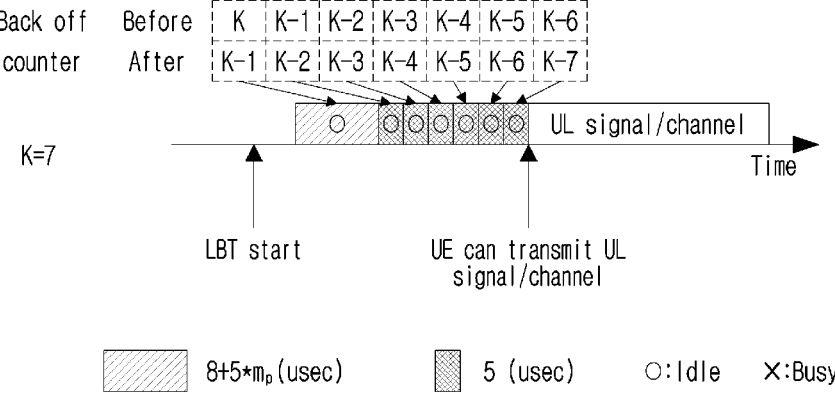
FIG. 12 and FIG. 13 illustrate a timing gap duration according to an embodiment of the present disclosure.

FIG. 12 illustrates a timing gap duration according to an embodiment of the present disclosure.

Referring to FIG. 12, a minimum time for a specific node (e.g., base station or UE) to check whether a channel is idle may be (if a channel is continuously idle) $8+5 \times m_p + (K-1) \times 5$ (usec). Here, K is a backoff counter value.

That is, according to an embodiment of the present disclosure, a timing gap duration between ROs and/or POs may be defined/configured as a minimum number of symbols including $8+5 \times m_p + (K-1) \times 5$ (usec).

For example, assuming that parameters used in NR-U are similarly introduced in FR4, $m_p$ may be 2, and contention window size (CWS) may be 3 or 7 (i.e., K may be selected from 3 or 7). Assuming that a CWS value is 3, an actual required timing gap duration between ROs and/or POs may be $8+5 \times 2+(3-1) \times 5=28$ (usec). Alternatively, assuming that a CWS value is 7, an actual required timing gap duration between ROs and/or POs may be $8+5 \times 2+(7-1) \times 5=48$ (usec).

Therefore, for example, when a timing gap duration of 28 (usec) is required, for SCS values {120, 240, 480, 960} kHz, a timing gap duration of each of {4 OFDM symbols (8.92*4=35.68 usec), 7 OFDM symbols (4.46*7=31.22 usec), 13 OFDM symbols (2.23*13=28.99 usec), 25 OFDM symbols (1.15*25=28.75 usec)} may be configured/indicated/defined, respectively.

As another example, when a timing gap duration of 48 (usec) is required, for SCS values {120, 240, 480, 960} kHz, a timing gap duration of each of {4 OFDM symbols (8.92*6=53.52 usec), 7 OFDM symbols (4.46*11=49.06 usec), 13 OFDM symbols (2.23*22=49.06 usec), 25 OFDM symbols (1.15*42=48.3 usec)} may be configured/indicated/defined, respectively.

Based on the above values, when SCS for Msg. 1 preamble, Msg. A preamble and Msg. A PUSCH, etc. is defined as above, for each SCS, a timing gap duration of an integer multiple of OFDM symbols may be configured to be defined between ROs and/or POs. That is, for each SCS, a timing gap duration between ROs and/or POs may be configured/defined as a minimum number of symbols including $8+5 \times m_p + (K-1) \times 5$ (usec).

Here, the timing gap duration as many as an integer multiple of an OFDM symbol to be configured between ROs and/or POs may be configured by a base station to a UE through higher layer signaling, etc. (e.g., system information block (SIB), RRC signaling, etc.), or may be determined as a value pre-agreed between a base station and a UE and specified in the standard.

As a second method, when a size of a timing gap duration required between ROs and/or POs is too large (e.g., 25 OFDM symbols), since RO and PO capacities are significantly reduced, it may be inefficient in resource management of a base station. In addition, even if a back-off counter value becomes 0, if a UE determines that a corresponding time point is not suitable for UL transmission (e.g., i) when a subframe boundary or symbol boundary does not match or ii) when it is not the RO or PO to transmit indicated by a base station or iii) when it is not the RO or PO that a UE intends to transmit), the UE may give up transmission at the corresponding time point.

Figure 13:
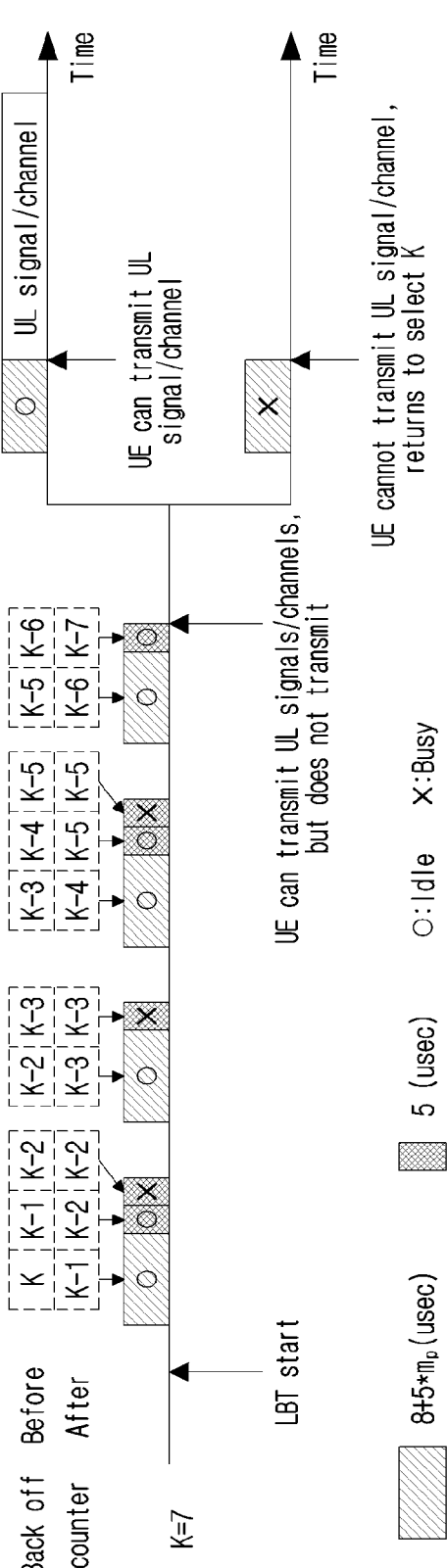

FIG. 13 illustrates a timing gap duration according to an embodiment of the present disclosure.

Referring to FIG. 13, after a value of a back-off counter becomes 0, a UE may give up UL transmission for the above reasons.

In this way, if a UE that gave up transmission after a value of a back-off counter became 0, when the UE confirmed that a channel is idle for $8+5 \times m_p$ (usec) right before the point at which the UE intends to transmit, the UE may perform UL transmission at a corresponding time. That is, a UE that gave up transmission after a value of a back-off counter becomes 0 can perform UL transmission when confirming that a channel is idle for $8+5 \times m_p$ (usec).

If a UE confirmed that a channel is busy for $8+5 \times m_p$ (usec) right before the point at which the UE intends to transmit, the UE should perform an LBT process again from a time of selecting a CWS value.

Based on such an LBT operation of a UE, after the UE sets a back-off counter value to 0 by the above-described operation, as soon as it is confirmed that a channel is idle for $8+5 \times m_p$ (usec) before a specific RO to transmit a PRACH or a specific PO to transmit a PUSCH, the UE can transmit a PRACH in the RO (transmits a PUSCH in the PO).

Here, for example, assuming that parameters used in NR-U are similarly introduced in FR4, $m_p$ may be 2. In this case, an actual required timing gap duration between an RO and/or a PO may be $8+5 \times 2=18$ (usec).

Therefore, for example, when a timing gap duration of 18 (usec) is required, for SCS values {120, 240, 480, 960} kHz, a timing gap duration of each of {3 OFDM symbols (8.92*3=26.76 usec), 5 OFDM symbols (4.46*5=22.3 usec), 9 OFDM symbols (2.23*9=20.07 usec), 16 OFDM symbols (1.15*16=18.4 usec)} may be configured/indicated/defined, respectively.

Based on the above values, when SCS for Msg. 1 preamble, Msg. A preamble and Msg. A PUSCH, etc. is defined as above, for each SCS, a timing gap duration of an integer multiple of OFDM symbols may be configured to be defined between ROs and/or POs. Here, similar to the above-mentioned method, a timing gap duration may be configured as many as an integer multiple of an OFDM symbol to be configured between the ROs and/or between the POs to a UE by a base station through higher layer signaling (e.g., SIB, RRC signaling, etc.), etc., or may be determined as a pre-agreed value between a base station and a UE and specified in the standard.

Additionally, in the above proposed methods, a method of configuring a timing gap duration at an OFDM symbol level was proposed, but configuring a timing gap duration even at a half OFDM symbol level may be considered. If configured in this way, actual RACH capacity and PUSCH capacity can be increased.

In addition, since there may be cases in which a timing gap duration is required as much as a plurality of OFDM symbols as described above, it may be impossible to configure validity for each even or odd number of ROs according to a specific PRACH format. For example, assuming that a PRACH format to be used by a base station is PRACH format A1 (i.e., 2 OFDM symbol durations per single RO), if a timing gap duration of 4 OFDM symbols is required, 2 ROs need to be invalidated. As another example, in PRACH format A1, when a timing gap duration of 7 OFDM symbols is required, 4 ROs need to be invalidated.

Therefore, a method in which a base station directly configures validity of a plurality of ROs of a specific RACH slot to a UE is proposed. For example, in order to configure validity of a plurality of ROs, a base station may configure/indicate a bitmap pattern (i.e., each bit corresponds to each RO, and a bit value indicates validity/invalidity of a corresponding RO) together with PRACH configuration. Alternatively, a base station may indicate/configure a starting invalid RO position corresponding to an initial invalid RO within a specific RACH slot and a number of contiguous invalid ROs, etc.

In addition, a base station may configure/indicate RACH slot level validity instead of RO level validity. For example, if a timing gap duration of 13 OFDM symbols is required and RACH slots are continuously arranged, a base station may configure/indicate that a duration of 1 RACH slot is invalidated. As another example, when a timing gap duration of 25 OFDM symbols is required and when RACH slots are continuously arranged, a base station may configure/instruct that two RACH slots are invalidated.

Therefore, a method in which the base station directly configures validity of one or more specific RACH slots to a UE is proposed. For example, in order to configure/indicate validity of one or more RACH slots, a base station may configure/indicate a bitmap pattern (i.e., each bit corresponds to each slot, and a bit value indicates validity/invalidity of a corresponding slot) together with PRACH configuration. Alternatively, a base station may indicate/configure a starting invalid RACH slot position corresponding to the first invalid RACH slot and a number of contiguous invalid RACH slots, etc.

Embodiment 1-2: Method of Configuring Timing Gap Duration Considering SSB Index, Directional LBT (D-LBT: Directional LBT), Etc In a timing gap duration between ROs and/or POs proposed in Embodiment 1-1 above, a base station may configure/indicate a timing gap duration or not, depending on a method, such as SSB to RO mapping and RO to PO mapping.

That is, a base station may configure a timing gap duration applied only between consecutive ROs and/or consecutive POs mapped to the same SSB (or the same beam direction). Alternatively, a timing gap duration applied only between ROs and/or POs mapped to the same SSB (or the same beam direction) may be defined in the standard.

For example, when a single SSB and a plurality of consecutive ROs are mapped in a time domain (t-domain) by SSB to RO mapping (i.e., 1:N SSB to RO mapping), since UEs selecting adjacent ROs select the same SSB, a beam direction is also the same. Therefore, in this case, a base station can configure/indicate a timing gap duration. Characteristically, a UE may determine that a timing gap duration is implicitly indicated according to an SSB to RO mapping relationship. That is, when SSB to RO mapping is 1:N SSB to RO mapping and a plurality of consecutive ROs in a time domain (T-domain) are linked to one SSB, a UE and a base station may determine that an RO is configured using a predefined timing gap duration, and may perform PRACH preamble transmission/reception operations accordingly.

As another example, a case where directional LBT is allowed may be considered. That is, a case in which a base station indicates that SSB to RO mapping is N: 1 and selects different SSBs among consecutive ROs on a t-domain may be considered. Here, since UEs that select different SSBs may configure different beam directions and perform directional LBT, a timing gap duration between ROs is not required. Therefore, in this case, there is no need for a base station to configure/indicate a timing gap duration, and a UE and a base station can determine that ROs exist continuously over time as in the conventional NR. Here, directional LBT means that LBT is performed only in an SSB direction corresponding to an RO selected by a UE, for example.

In addition, even if a timing gap duration between ROs is configured/indicated for a case of using an additional omni-directional LBT, when configured/indicated to use directional LBT (regardless of SSB-to-RO mapping), a UE and a base station may perform an RACH procedure without applying the timing gap duration any longer.

Meanwhile, a method similar to the above may be applied even when RO to PO mapping is considered. For example, assuming that SSB to RO mapping is 1:N and RO to PO mapping is 1:1, a case in which ROs and POs are continuously arranged on the t-domain may be considered. In this case, as mentioned above, a timing gap duration can be configured/indicated between ROs, and similarly, a timing gap duration can also be configured/indicated between POs that are 1:1 mapped to ROs. Here, a timing gap duration between ROs and a timing gap duration between POs may be independently configured/indicated, or values of a timing gap duration between ROs and a timing gap duration between POs may be configured identically. For example, if an SCS value to be used when transmitting Msg. A preamble and an SCS value to be used when transmitting Msg. A PUSCH, it may be desirable to configure a timing gap duration between ROs and a timing gap duration value between POs to be the same. In addition, in this case, when only a timing gap duration between ROs is given and there is no timing gap duration between POs, a UE may determine/assume that a timing gap duration value between ROs and a timing gap duration value between POs are the same (i.e., it is configured that a timing gap duration between POs is used by taking the timing gap duration between ROs as it is).

Embodiment 1-3: Method for Allocating RO in RACH Slot

A base station may notify which PRACH format can be transmitted for a specific duration at a specific timing and how many ROs are present in a corresponding slot through higher layer signaling (e.g., prach-ConfigurationIndex or msgA-PRACH-ConfigurationIndex). A table for random access configurations is defined in TS 38.211, and PRACH transmission time domain resources may be determined according to a PRACH configuration index indicated by higher layer signaling.

Table 13 illustrates a portion of a table for random access configurations.

TABLE 13

| PRACH configuration idex | Preamble format | $N_f$ mod x = y |  | Slot number | Starting symbol | Number of PRACH slots in a 60 kHz slot | $N_t^{RA, slot}$, Number of time domain PRACH occasions (ROs) in a PRACH slot | $N^{durRA}$, PRACH duration |
|---|---|---|---|---|---|---|---|---|
|  |  | x | y |  |  |  |  |  |
| 81 | A1 | 1 | 0 | 4, 9 | 0 | 1 | 6 | 2 |
| 82 | A1 | 1 | 0 | 7, 9 | 7 | 1 | 3 | 2 |
| 100 | A2 | 1 | 0 | 9 | 9 | 1 | 1 | 4 |
| 101 | A2 | 1 | 0 | 9 | 0 | 1 | 3 | 4 |
| 127 | A3 | 1 | 0 | 4, 9 | 0 | 1 | 2 | 6 |
| 128 | A3 | 1 | 0 | 7, 9 | 7 | 1 | 1 | 6 |
| 142 | B1 | 1 | 0 | 4, 9 | 2 | 1 | 6 | 2 |
| 143 | B1 | 1 | 0 | 7, 9 | 8 | 1 | 3 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 251 | A3/B3 | 1 | 0 | 4, 9 | 0 | 1 | 2 | 6 |
| 252 | A3/B3 | 1 | 0 | 7, 9 | 2 | 1 | 2 | 6 |

Figure 14:
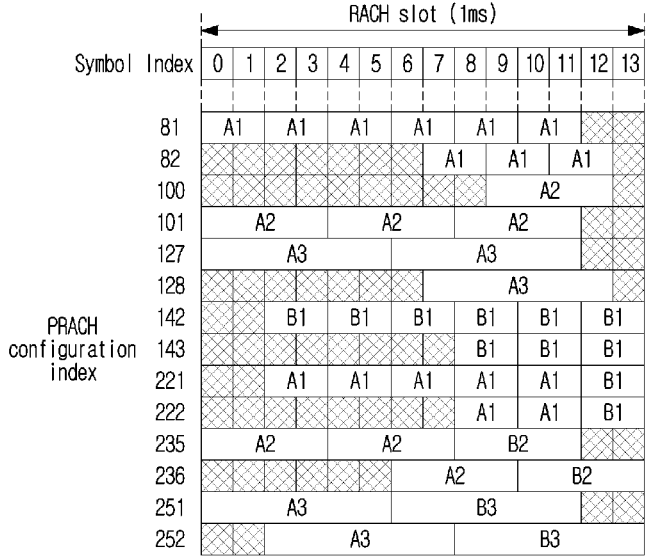
FIG. 14 illustrates a form in which an RO is configured in a RACH slot for each PRACH configuration index value.

Referring to Table 13, it is possible to know how many ROs are defined in an RACH slot for each preamble format ($N_t^{RA,slot}$) and how many OFDM symbols a PRACH preamble of each preamble format occupies ($N_{dur}^{RA}$). In addition, since a starting symbol of the first RO may be indicated for each preamble format, information indicating at what point in the corresponding RACH slot the RO starts may be transmitted and received between a base station and a UE. FIG. 14 illustrates a form in which an RO is configured in a RACH slot for each PRACH configuration index value of Table 13.

As a gap (i.e., timing gap duration) between ROs proposed in Embodiment 1-1 and/or 1-2 is added, the number of ROs in a RACH slot may not be allocated as much as the number of ROs allocated to the existing PRACH configuration. In this case, the following additional proposed methods may be configured/applied.

i) Method 1: As a corresponding RACH slot includes a timing gap between ROs, when the number of ROs allocated to the existing PRACH configuration in the corresponding RACH slot cannot be allocated, it may be configured/defined that the remaining ROs and/or a timing gap between ROs are/is allocated in a slot immediately following the corresponding RACH slot. In this configuration, it is possible to solve an RO density reduction problem that may occur by adding a timing gap between ROs. In addition, there is an advantage in that a previously defined an SSB-to-RO mapping rule can be used as it is without changing it.

If a slot immediately following the RACH slot (e.g., RACH slot #0) is also another RACH slot (e.g., RACH slot #1)

(Alt 1) ROs not allocated to RACH slot #0 may be allocated to RACH slot #1 first, and then ROs corresponding to RACH slot #1 may be allocated (i.e., all ROs not allocated to the previous RACH slot #0 are allocated to RACH slot #1). In addition, (a timing gap is also added), ROs not allocated to RACH slot #1 thereafter may be allocated immediately to the next slot.

(Alt 2) ROs not allocated to RACH slot #0 may be allocated to a slot following RACH slot #1. After ROs not allocated to RACH slot #0 are all allocated, ROs not allocated to RACH slot #1 may be subsequently allocated.

ii) Method 2: After allocating ROs to a corresponding RACH slot until no more allocating is possible, the unallocated ROs may be configured/defined as invalid.

For example, assuming that RO mapping is configured/defined so as not to cross a slot boundary and that RO mapping is valid until the last OFDM symbol of the corresponding slot, maximum RO may be configured/defined to be mapped/allocated to the corresponding slot. Here, even if an RO is located on a slot boundary (i.e., the last OFDM symbol of a RACH slot), since an SCS value targeted by B52 (beyond 52.6 GHZ) (i.e., FR 4) is large (e.g., 120, 480, 960 KHz), interference may not be significant to the UL signal/channel that follows. Therefore, (regardless of the PRACH format) it can be configured/defined to locate/allocate ROs up to a slot boundary (i.e., the last OFDM symbol of a RACH slot). In other words, while RO mapping does not cross the slot boundary, it is assumed that up to the last OFDM symbol of a corresponding RACH slot is valid for RO mapping, and maximum RO mapping can be configured.

Figure 15:
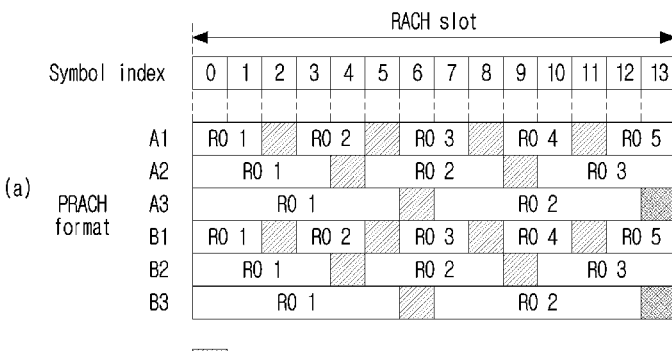
FIG. 15 illustrates mapping of RACH occasions according to one embodiment of the present disclosure.
Figure 15:
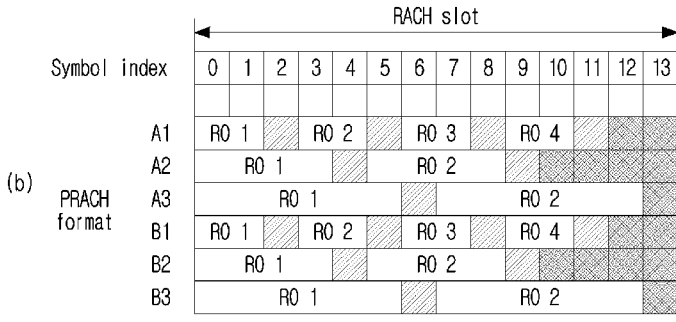

FIG. 15 illustrates mapping of RACH occasions according to one embodiment of the present disclosure.

FIG. 15 (*a*) illustrates a case where an RO is mapped assuming that RO mapping is valid up to the last OFDM symbol, and FIG. 15(*b*) illustrates a case in which an RO is configured such that a timing gap may exist after the last RO for PRACH format A.

Referring to FIG. 15(*a*), as described above, as many ROs as possible up to the last OFDM symbol of the RACH slot may be allocated/mapped in a corresponding RACH slot.

Here, since there is no guard period (GP) in a case of PRACH format A, a RACH slot immediately follows and an RO may start from the first OFDM symbol of the next RACH slot, an LBT gap (i.e., timing gap) for the first RO of the next RACH slot may be required.

Therefore, as shown in FIG. 15(*b*), in a case of PRACH format A, a method of maximally mapping ROs within a corresponding RACH slot may be used only until a timing gap is ensured (or to be guaranteed) after the last RO within the RACH slot.

Alternatively, when a starting OFDM symbol of a subsequent RACH slot of a corresponding RACH slot is given as a specific value (e.g., enough OFDM symbol(s) to be used as a timing gap) other than 0, (regardless of a PRACH format) it may be configured/defined so that RO mapping may not cross a slot boundary, but maximum ROs are mapped/allocated assuming that RO mapping is valid until the last OFDM symbol of a corresponding RACH slot.

Here, as described above, when only a smaller number of ROs than a number (e.g., 6) allocated to the existing PRACH configuration is configured as a valid RO (e.g., 4 or 5 ROs), additional configuration may be required for an SSB-to-RO mapping operation.

For example, a method in which an SSB may be mapped based on a total number of ROs obtained by adding valid ROs+invalid Ros (i.e., a number of ROs allocated to the existing PRACH configuration, i.e., 6 according to the example above), and when a UE selects an actual RO, a method of not selecting an invalid RO may be applied. In this case, when a number of ROs mapped to one SSB is large, there is no problem because invalid ROs are not selected and valid ROs can be selected. However, when a number of ROs mapped to one SSB is one or when several SSBs are mapped to one RO, a UE that has selected a specific SSB may have difficulty transmitting a PRACH preamble using an appropriate UL beam because an RO paired with a corresponding SSB may be in an invalid state.

Therefore, as another example, it may be configured/defined that an SSB is newly mapped based on a number of valid ROs (e.g., 4 or 5) configured by adding a timing gap. In this case, since an RO corresponding to a specific SSB is always valid, there is no problem with a UE transmitting a PRACH preamble using an appropriate UL beam. Here, if a ratio for SSB-to-RO mapping does not match a number of valid ROs (e.g., if SSB-to-RO mapping is 1:1, there are 6 SSBs and 6 ROs, but when validity is considered, a number of ROs becomes 4), it may be configured/defined that a total number of preamble indices of a currently valid RO is equally mapped to N SSBs without following an SSB-to-RO mapping ratio indicated by a base station.

Additionally, in configuring a timing gap for an RO, based on an RO order in a timing domain, it is divided into even ROs and odd ROs, and either one can be configured as a valid RO group and the other can be configured/defined as an invalid RO group. Alternatively, a plurality of specific ROs among all ROs may be configured/defined as an invalid RO group. In this case, SSB-to-RO mapping also needs to be modified.

As a first method, SSB-to-RO mapping is performed by adding all valid ROs+invalid ROs (e.g., all ROs), and then a UE may operate to select only a valid RO (e.g., the remaining ROs except for a plurality of invalid ROs among an even RO group, an odd RO group, or all ROs). In this case, when a number of ROs mapped to one SSB is large, there is no problem because invalid ROs are not selected and valid ROs can be selected. However, when a number of ROs mapped to one SSB is one, or when several SSBs are mapped to one RO, a UE that has selected a specific SSB may have difficulty transmitting a PRACH preamble using an appropriate UL beam because an RO paired with a corresponding SSB may be in an invalid state.

As a second method, SSB-to-RO mapping may be configured/defined with only valid ROs (e.g., the remaining ROs except for a plurality of invalid ROs among an even RO group, an odd RO group, or all ROs). Even in this case, if a ratio for SSB-to-RO mapping does not match a number of valid ROs, it can be configured/defined so that an SSB-to-RO mapping ratio indicated by a base station is not followed and a total number of preamble indices of a currently valid RO is evenly mapped to N SSBs.

Although the above proposal was based on RACH occasion (RO), the method proposed above may be configured/applied similarly to a PUSCH occasion (PO) for transmitting Msg. A PUSCH of a 2-step RACH.

In the method proposed above, when a number of ROs allocated to the existing PRACH configuration, including a timing gap between ROs, is not allocated to a specific RACH slot indicated by a base station, a method of allocating the remaining ROs and/or a timing gap between ROs to the next slot was proposed. Here, when a base station allocates/indicates the last slot among a plurality of slots of a 480/960 kHz SCS facing (e.g., overlapped or included) a specific slot of a reference SCS (e.g., 120 kHz) as the specific RACH slot, a problem arises in that a slot immediately following the indicated RACH slot deviate from a specific slot of reference SCS. In other words, it is desirable to keep a number of RACH slots (or density) or a number of ROs (or density) constant in a specific slot of reference SCS, but a problem in which this is not kept occurs.

For example, it is assumed that a total number of ROs in a specific RACH slot is 6, each RO is composed of 2-symbols, and a gap between ROs is also configured to a 2-symbol interval. Here, when an RO mapping start slot is indicated as the last slot among a plurality of slots of 480/960 KHz SCS facing a specific slot of reference SCS, the first 4 ROs are located in the last 480/960 SCS slot, but a problem occurs because the remaining 2 ROs cross a specific slot boundary of reference SCS. Therefore, the following methods can be proposed to solve this problem.

Method A: Among a plurality of higher SCS (e.g., 480/960 kHz) slots facing (e.g., overlapped or included) a specific slot of reference SCS (e.g., 120 kHz), a specific slot may be fixed as an RO mapping starting slot.

For example, assuming that the last slot among a plurality of higher SCS slots is a slot index k, and a number of slots capable of mapping all ROs and/or timing gaps between ROs is N, slot index k-N+1 may be fixed as the RO mapping starting slot. If N=2, an RO mapping starting slot may be fixed as the second last slot (i.e., slot index k-1).

Meanwhile, since a PRACH duration may be different for each RACH format and a timing gap between ROs may be configured differently for each SCS (and/or by LBT type), it may be desirable to use a method that can cover all cases. Therefore, a method of fixing a first slot among a plurality of higher SCS slots as an RO mapping starting slot may be considered. In this configuration, considering most of a PRACH duration and/or a timing gap size between ROs, all ROs can always be configured to locate within a specific slot of reference SCS.

Alternatively, appropriate combination of the above two examples may be considered according to specific conditions. Alt 1) Regardless of whether a timing gap between ROs is configured, the first slot among a plurality of higher SCS slots can always be fixed as an RO mapping starting slot. Alternatively, Alt 2) When a timing gap between ROs is configured, it can be defined such that the first slot among a plurality of higher SCS slots is configured as a starting slot for RO mapping, and when a timing gap between ROs is not configured, it can be defined such that the last slot among a plurality of higher SCS slots is configured as a starting slot for RO mapping.

[Method B] Among a plurality of higher SCS (e.g., 480/960 kHz) slots facing (e.g., overlapped or included) a specific slot of reference SCS (e.g., 120 kHz), a base station may configure/indicate a specific slot as an RO mapping starting slot. Here, (if a total number of ROs according to a configured/indicated RACH configuration is N) a base station needs to configure so that a time including all timing gaps of N ROs+N (or N−1) timing gaps does not exceed a specific slot of reference SCS. In other words, when configuring/indicating a starting slot for RO mapping from a base station, a UE can expect an RO and/or a timing gap to be indicated not to exceed a specific slot of reference SCS. A configuration/indication for an RO mapping starting slot may be transmitted to a UE through higher layer signaling (e.g., SIB or RRC signaling). For example, a base station may configure/indicate an RO mapping starting slot together with RACH configuration index information.

Meanwhile, when a timing gap between ROs is configured, it is necessary to determine whether or not to maintain an RO pattern (e.g., an RO pattern including a starting symbol introduced to empty a previous X (X is a natural number) OFDM symbol for PDCCH reception, or the last symbol gap left empty for PUCCH transmission) according to an indication of the existing RACH configuration table. Here, as an example, a timing gap between ROs can be configured to be located before (or behind) a specific RO.

As a first method, even when a timing gap between ROs is configured, an RO pattern according to an indication of the existing RACH configuration table can be maintained as it is.

Figure 16:
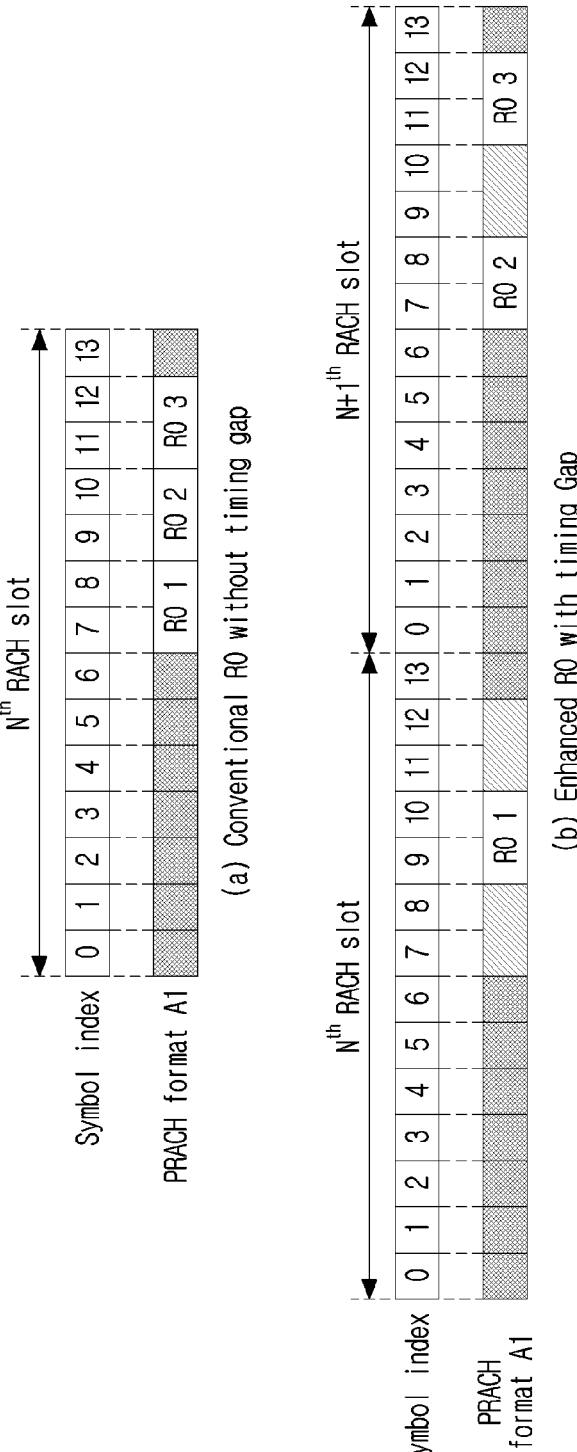
FIG. 16 to FIG. 18 are diagrams illustrating patterns of RACH occasions according to one embodiment of the present disclosure.

For example, as shown in Table 14 below, for a configuration value of RACH configuration index 12 for FR2, a starting symbol is 7, a PRACH duration is 2 symbols, and a number of ROs in a RACH slot is 3. In this situation, when a timing gap between ROs is given as 2 symbols, actual RO mapping may be configured as shown in FIG. 16.

Figure 17:
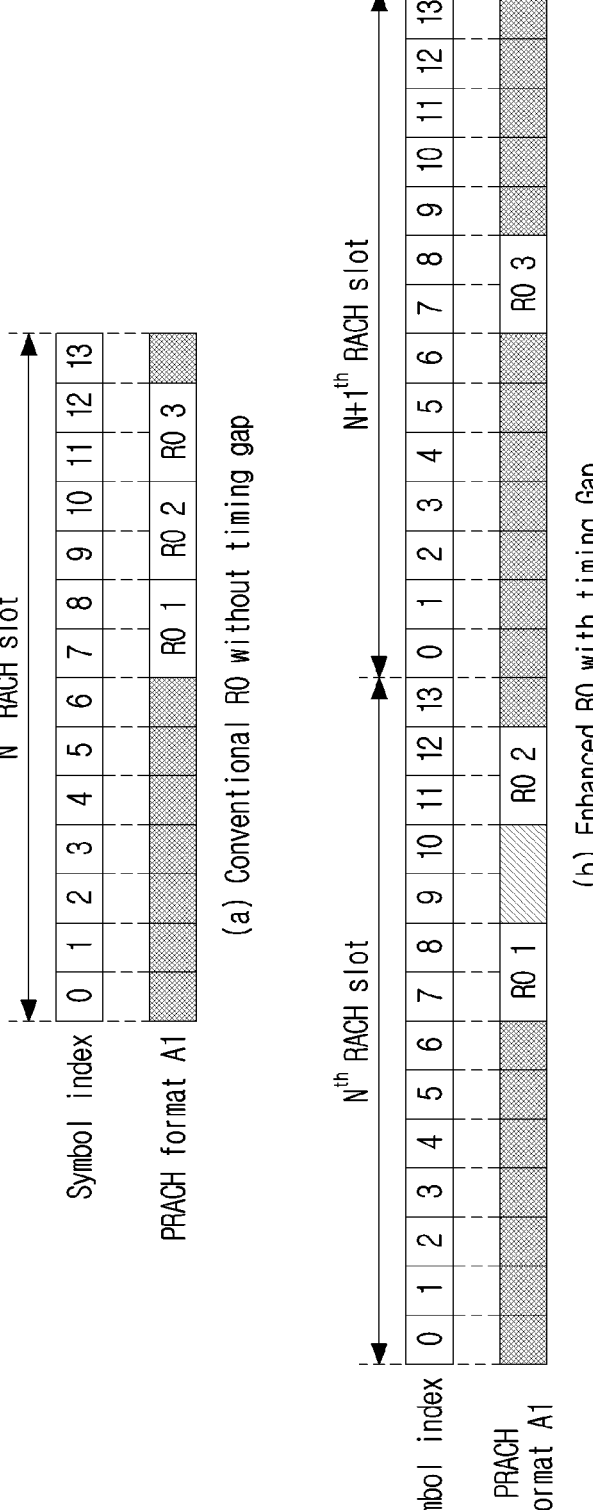

Table 14 illustrates a PRACH configuration (for FR2).

be configured to skip a timing gap before the RO. If this is configured, RO mapping can be configured as shown in FIG. 17(*b*). That is, referring to FIG. 17(*b*), since RO2 and RO3 are not mapped to successive symbols in time, a timing gap between RO2 and RO3 can be skipped.

Figure 18:
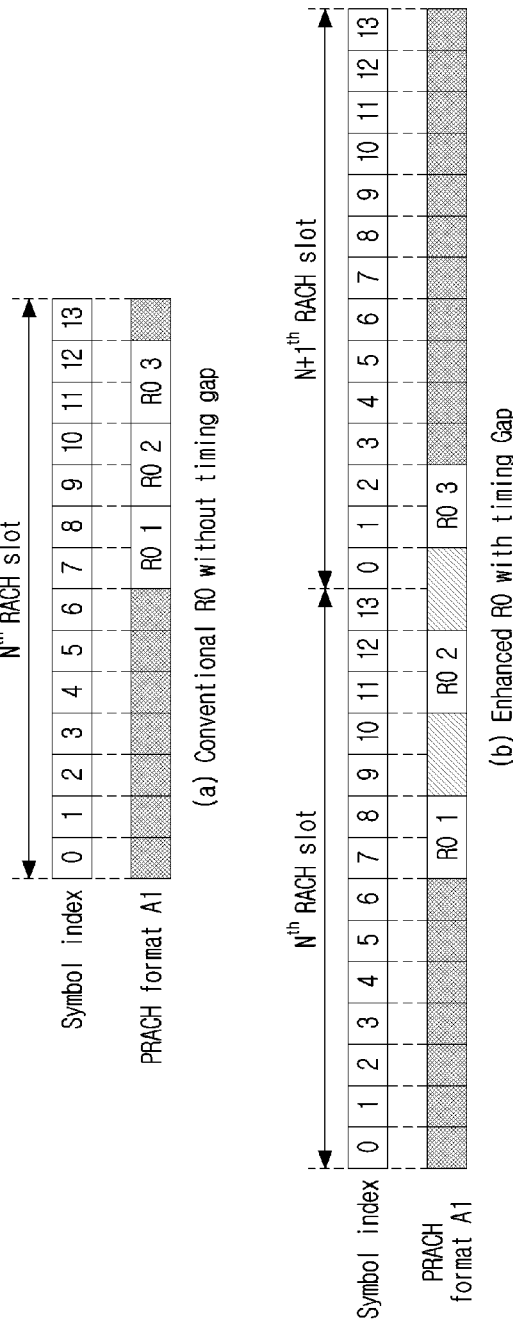

In the third method, when a timing gap between ROs is configured, a method in which an indication in the existing RACH configuration table may be maintained only in the first RACH slot (i.e., a RACH slot configured/indicated by a base station) and not maintained in subsequent slots. That is, if a corresponding configuration value (e.g., start symbol) is applied only to a starting RACH slot indicated by a base station and an RO needs to be mapped to the next slot, in the next slot, it may be configured/defined that a corresponding configuration value (e.g., start symbol) is not applied. Accordingly, with this configuration, RO mapping can be configured as shown in FIG. 18(*b*). That is, referring to FIG. 18(*b*), as shown in Table 14 above, a start symbol index of an RO is 7, but in the N+1th RACH slot (i.e., a RACH slot other than the first RACH slot), RO3 may be mapped following a timing gap configured after RO2 without applying a start symbol index of an RO.

Additionally, when a timing gap between ROs is configured, a method of retaining an indication of the existing RACH configuration table only in the first RACH slot (i.e., a RACH slot configured/indicated by a base station) and the last RACH slot (ROs can be located across slot boundaries) and not maintaining them in the remaining slots may be considered. As a result, an RO and/or a timing gap between ROs may be alternately and continuously located. And, in the first RACH slot, as much as a starting symbol indicated by a base station is emptied (i.e., from the first symbol to a starting symbol), it can be used for PDCCH reception

TABLE 14

| PRACH configuration idex | Preamble format | $N_f$ mod x = y | Slot number | Starting symbol | Number of PRACH slots in a 60 kHz slot | $N_t^{RA, slot}$, Number of time domain PRACH occasions (ROs) in a PRACH slot | $N_{dur}^{RA}$, PRACH duration |
|---|---|---|---|---|---|---|---|
| 12 | A1 | 1        0 | 19, 39 | 7 | 1 | 3 | 2 |

FIG. 16 to FIG. 18 are diagrams illustrating patterns of RACH occasions according to one embodiment of the present disclosure. FIGS. 16(*a*), 17(*a*), and 18(*a*) illustrate RO mapping when following the existing RO mapping method (i.e., no timing gap) when a RACH configuration index 12 for FR2 is configured as shown in Table 14 above.

In FIG. 16 (*b*), an RO pattern to which the first method is applied is illustrated. In an RO pattern as shown in FIG. 16(*a*), when a timing gap between ROs is configured to 2 OFDM symbols, and the existing RO mapping pattern (e.g., the start OFDM symbol, etc.) is maintained in all RACH slots, RO mapping as shown in FIG. 16 (*b*) may be configured. That is, a timing gap and each RO may be alternately mapped.

As a second method, when a timing gap between ROs is configured, a timing gap between ROs may be configured from ROs existing earlier in time. In addition, when a slot is passed, as a result of maintaining an RO pattern according to an indication of the existing RACH configuration table, if ROs are not continuously arranged in time, it may be configured to skip a timing gap between ROs. Alternatively, when a specific RO does not start at a slot boundary, it may operation. In addition, in the last RACH slot, it may be configured that as many as the last Y (or a number greater than Y) OFDM symbols are emptied so that they can be used for PUCCH transmission operation (if there is no timing gap between ROs, assuming that actual ROs are mapped within a RACH slot and a number of remaining OFDM symbols is Y (Y is a natural number) from the last OFDM symbol).

The proposed methods consider a method of mapping a timing gap between ROs and/or ROs from a starting RACH slot configured/indicated by a base station. Meanwhile, as another method, a method in which a RACH slot configured/indicated by a base station becomes the last RACH slot may also be considered. That is, a scheme in which an RO and/or a timing gap between ROs is mapped (in order) starting from the last OFDM symbol of the last RACH slot (or the last OFDM symbol of the last RO of a corresponding slot) may also be considered (i.e., a method in which an RO and/or a timing gap between ROs is mapped in reverse chronological order). In this case, it may be configured that an RO and/or a timing gap between ROs is mapped to the last RACH slot, and if there are not enough resources to be mapped, the remaining ROs and/or timing gaps between ROs are additionally mapped following the previous (i.e., 2nd last) slot.

The above methods are applicable when a base station indicates a higher SCS (e.g., 480/960) slot facing (e.g., overlapped or included) a RACH slot of reference SCS. Therefore, most of the methods propose arranging the remaining ROs in a slot adjacent to a slot indicated by a base station. Slightly different from this, a situation in which a base station indicates (continuously or discontinuously) a plurality of higher SCS (e.g., 480/960) slots facing a RACH slot of reference SCS can also be considered. In this case, it can be configured to map an RO and/or a timing gap between ROs over a plurality of (continuous or discontinuous) slots indicated by a base station, and the previously proposed methods can be similarly applied in this case.

Although the above proposal has been proposed based on a RACH occasion (RO), the previously proposed scheme can be similarly configured/applied to a PUSCH occasion (PO) for transmitting Msg. A PUSCH of a 2-step RACH.

Embodiment 2: Physical Random Access Channel (PRACH) Sequence Length Indication Through PDCCH For example, a Zadoff-Chu (ZC) sequence of 139, a ZC sequence of length 571, and a ZC sequence of length 1151 may be considered as a length of a PRACH sequence in a band above 52.6 GHz. Here, when considering power spectral density (PSD) requirements and maximum power limit for each SCS, an appropriate sequence length can be configured/defined as shown in Table 15 below.

Table 15 illustrates a ZC sequence length for each SCS.

TABLE 15

| SCS (kHz) | Number of PRBs | Total Tx Power (dBm) | Number of RES | ZC sequence length |
|---|---|---|---|---|
| 120 | 35 | 40.02 –> 40 | 420 | 571 |
| 240 | 18 | 40.14 –> 40 | 216 | 571 |
| 480 | 9 | 40.14 –> 40 | 108 | 139 |
| 960 | 5 | 40.60 –> 40 | 60 | 139 |

Therefore, when a UE in idle mode (or inactive mode) initially accesses, if an SCS value for PRACH transmission (i.e., an SCS value of an initial UL BWP) is 120 or 240 kHz, a PRACH sequence can be configured to use the L571-ZC sequence, and in the case of 480 or 960 kHz, a PRACH sequence can be configured to use the L139-ZC sequence.

A base station may configure/indicate a UE of such a sequence length through higher layer signaling (e.g., SIB or RRC signaling). In addition, a PRACH configuration associated therewith may also be configured/indicated to a UE through higher layer signaling (e.g., SIB or RRC signaling).

Meanwhile, a UE performing the RACH procedure and entering a connected mode may be configured to perform UL signal/channel transmission according to an SCS value of an activated UL BWP. For example, an SCS value of an UL BWP may be 120 kHz and an SCS value of an active UL BWP may be configured to 480 kHz. Since an initial UL BWP and an active UL BWP use different SCSs, if an RO is not separately configured in an active UL BWP, when a base station transmits a DCI format indicating a PDCCH order RACH procedure to a UE, the UE may change SCS to 120 KHz SCS (i.e., SCS of an initial UL BWP), move to an initial UL BWP, and transmit a PRACH preamble.

If a base station indicates/configures a new PRACH sequence length (e.g., L139 When ZC sequence) and a PRACH configuration to configure an RO using an SCS value (e.g., 480 kHz) indicated in an active UL BWP through UE-specific RRC signaling, when a base station transmits a DCI format indicating a PDCCH order RACH procedure to a UE, the UE may transmit a PRACH preamble using the L139-ZC sequence to an RO existing in an active UL BWP without changing SCS. In this case, an RO transmitted through an existing SIB, etc. may be overridden.

Here, a base station may indicate a new PRACH sequence length and/or a PRACH configuration using an SCS value (e.g., 480 kHz) indicated in an active UL BWP through UE specific RRC signaling. In this case, it may be configured/indicated that a UE effectively stores RO information using an SCS value (e.g., 120 kHz) indicated in an initial UL BWP previously received through an SIB, etc. This may be for a base station to indicate a UE to select an RO in an initial UL BWP when it is expected that an RO in an active UL BWP takes a lot of load. That is, a base station may indicate a length of a PRACH sequence to be transmitted by a UE through DCI conveying a PDCCH order. For example, it is assumed that an SCS value of an active UL BWP is 480 kHz, a PRACH sequence length is the L139-ZC sequence, an SCS value of an initial UL BWP is 120 KHz, and a PRACH sequence length is the L571-ZC sequence. Here, a base station can configure to indicate one of L139 or L571 using a specific 1-bit field of a PDCCH order DCI format (or using an existing field). If this operation is not supported, when an RO in an active UL BWP is expected to take a lot of load, in order to allow a UE to select an RO in an initial UL BWP, the UE may be indicated to leave the RRC connected mode (i.e., switch back to idle mode or inactive mode) and perform a new initial access. However, this method requires additional processing time for changing an RRC mode, and a RACH procedure may need to be almost always performed in contention-based random access (CBRA).

In addition, instead of a method of indicating a sequence length using a specific 1-bit field of a PDCCH order DCI format, methods of directly indicating SCS of a preamble through a PDCCH order DCI format, or indicating combinations of a PRACH configuration index and SCS, or indicating combinations of a PRACH configuration index and a sequence length may also be used. For example, if SCS of an initial UL BWP is 120 KHz and SCS of an active UL BWP is 480 kHz, one of {120 KHz, 480 kHz} can be indicated using a specific 1-bit field of a PDCCH order DCI format. If 120 KHz SCS is indicated, a UE may move to an initial UL BWP and transmit a PRACH preamble using a sequence length suitable for a corresponding RO (e.g., L571-ZC sequence). On the other hand, when 480 kHz SCS is indicated, a UE may transmit a PRACH preamble using a sequence length suitable for an RO of an active UL BWP (e.g., L139-ZC sequence).

In addition, instead of a method of indicating a sequence length using a specific 1-bit field of a PDCCH order DCI format or a method of directly indicating SCS of a preamble, one of an initial UL BWP and an active UL BWP may be indicated (i.e., BWP to transmit a RACH preamble). That is, when there is an RO for the L571-ZC sequence in an initial UL BWP and an RO for the L139-ZC sequence in an active UL BWP, by indicating one of an initial UL BWP and an active UL BWP using a specific 1-bit field (or using an existing field) of a PDCCH order DCI format, one of the L571 sequence and the L139 sequence to be used by a UE can be indicated.

When an initial UL BWP is indicated, a UE may transmit a RACH preamble by selecting SCS and a sequence length (e.g., L571-ZC sequence in 120 KHz SCS) suitable for an RO configured in an initial UL BWP. On the other hand, when an active UL BWP is indicated, a UE may transmit a RACH preamble by selecting SCS and a sequence length (e.g., L139-ZC sequence in 480 KHz SCS) suitable for an RO configured in an active UL BWP.

Meanwhile, a 1-bit field for BWP selection in the proposed PDCCH order DCI format may be activated when a specific situation/condition is satisfied. For example, only when a specific situation/condition is satisfied, a 1-bit field for BWP selection in a PDCCH order DCI format may exist. Alternatively, there is always a 1-bit field for BWP selection in a PDCCH order DCI format, but a UE follows a field value only when a specific situation/condition is satisfied, and otherwise, a field value may be ignored.

For example, when an initial UL BWP and an active UL BWP are different and SCS values configured to be used in the two BWPs are different, it can be activated. Alternatively, it may be activated when PRACH sequence lengths to be used for ROs allocated to an initial UL BWP and an active UL BWP are different from each other. If an initial UL BWP and an active UL BWP are the same, a corresponding bit field may be inactivated (e.g., a corresponding field does not exist or a UE may ignore it). Alternatively, even if an initial UL BWP and an active UL BWP are different, if an SCS value used is the same or a length of a PRACH sequence used in an RO allocated to each BWP is the same, a corresponding bit field may be deactivated (e.g., field does not exist or a UE may ignore it).

As another example, when a frequency resource overlaps between an initial UL BWP and an active UL BWP, a bit field may be activated. For example, only when a specific situation/condition is satisfied, a 1-bit field for BWP selection in a PDCCH order DCI format may exist. Alternatively, there is always a 1-bit field for BWP selection in a PDCCH order DCI format, but a UE follows a field value only when a specific situation/condition is satisfied, and otherwise, a field value may be ignored.

If there is an overlap of a frequency resource between an initial UL BWP and an active UL BWP, since a PRACH preamble (of connected mode UE) transmitted in an active UL BWP may cause strong interference to a PRACH preamble (of idle/inactive mode UE) transmitted in an initial UL BWP, by activating the bit field, a base station can select an appropriate RO.

If a 1-bit field for BWP selection in the proposed PDCCH order DCI format is activated, a UE may transmit a PRACH preamble in an RO present in a BWP indicated by the field. On the other hand, if a corresponding 1-bit field is inactivated, a UE may follow the existing Rel-16 NR operation (i.e., if an RO is configured in an active UL BWP, an RO of an active UL BWP is selected; otherwise, an RO of an initial UL BWP is selected).

Embodiment 3: PRACH Sequence Mapping

As in TS 38.211 16 below, for available PRACH subcarrier spacing (SCS) and PUSCH SCS, ae number of RBs (i.e., PRACH resource allocation) (i.e. $N_{RB}^{RA}$ value) occupied by a PRACH (i.e. each PRACH instance), expressed as a number of resource blocks (RBs) for a PUSCH, and an offset (i.e., $\bar{k}$) for PRACH sequence mapping in PRACH resource allocation are defined.

Table 16 illustrates supported combinations of SCS for a PRACH (i.e., $\Delta f_{RA}$) and SCS for a PUSCH (i.e., $\Delta f$), and allocation expressed in a number of RBs for a PUSCH (i.e., a number of RBs occupied by PRACH) ($N_{RB}^{RA}$), a corresponding value of an offset (i.e., $\bar{k}$) (this is used for proper subcarrier alignment between a PRACH and major resource block grids) for PRACH sequence mapping in the allocation.

TABLE 16

| $L_{RA}$ | $\Delta f_{RA}$ for PRACH | $\Delta f$ for PUSCH | $N_{RB}^{RA}$, Allocation expressed in number of RBs for PUSCH | $\bar{k}$ |
|---|---|---|---|---|
| 839 | 1.25 | 15 | 6 | 7 |
| 839 | 1.25 | 30 | 3 | 1 |
| 839 | 1.25 | 60 | 2 | 133 |
| 839 | 5 | 15 | 24 | 12 |
| 839 | 5 | 30 | 12 | 10 |
| 839 | 5 | 60 | 6 | 7 |
| 139 | 15 | 15 | 12 | 2 |
| 139 | 15 | 30 | 6 | 2 |
| 139 | 15 | 60 | 3 | 2 |
| 139 | 30 | 15 | 24 | 2 |
| 139 | 30 | 30 | 12 | 2 |
| 139 | 30 | 60 | 6 | 2 |
| 139 | 60 | 60 | 12 | 2 |
| 139 | 60 | 120 | 6 | 2 |
| 139 | 120 | 60 | 24 | 2 |
| 139 | 120 | 120 | 12 | 2 |
| 571 | 30 | 15 | 96 | 2 |
| 571 | 30 | 30 | 48 | 2 |
| 571 | 30 | 60 | 24 | 2 |
| 1151 | 15 | 15 | 96 | 1 |
| 1151 | 15 | 30 | 48 | 1 |
| 1151 | 15 | 60 | 24 | 1 |

In Table 16. $L_{RA}$ corresponds to a length of a PRACH sequence.

Meanwhile, in B52 (beyond 52.6 GHz) (i.e., FR 4), higher SCSs (e.g., 120, 480, 960 kHz SCS respectively) can be used for a PRACH and a PUSCH, and 139, 571, 1151, etc. can be used as a PRACH sequence length.

Table 17, for B52 (beyond 52.6 GHZ) (i.e., FR 4) according to an embodiment of the present disclosure, illustrates supported combinations of SCS for a PRACH (i.e., $\Delta f_{RA}$) and SCS for a PUSCH (i.e., $\Delta f$), and allocation expressed in a number of RBs for a PUSCH (i.e., a number of RBs occupied by PRACH) ($N_{RB}^{RA}$), a corresponding value of an offset (i.e., $\bar{k}$) for PRACH sequence mapping in the allocation.

TABLE 17

| $L_{RA}$ | $\Delta f_{RA}$ for PRACH | $\Delta f$ for PUSCH | $N_{RB}^{RA}$, Allocation expressed in number of RBs for PUSCH | $\bar{k}$ |
|---|---|---|---|---|
| 139 | 120 | 480 | 3 | 2 |
| 139 | 120 | 960 | X (e.g., X = 2, 1.5) | Y (e.g., Y = 12, 24, 36, 14, 26, 38) |
| 139 | 480 | 120 | 48 | 2 |
| 139 | 480 | 480 | 12 | 2 |
| 139 | 480 | 960 | 6 | 2 |
| 139 | 960 | 120 | 96 | 2 |
| 139 | 960 | 480 | 24 | 2 |
| 139 | 960 | 960 | 12 | 2 |
| 571 | 120 | 120 | 48 | 2 |
| 571 | 120 | 480 | 12 | 2 |
| 571 | 120 | 960 | 6 | 2 |
| 571 | 480 | 120 | 192 | 2 |
| 571 | 480 | 480 | 48 | 2 |
| 571 | 480 | 960 | 24 | 2 |
| 1151 | 120 | 120 | 96 + A | $A*12*SCS_{PUSCH}/120/2$ |
| 1151 | 120 | 480 | 24 + A | $A*12*SCS_{PUSCH}/120/2$ |

TABLE 17-continued

| $L_{RA}$ | $\Delta f_{RA}$ for PRACH | $\Delta f$ for PUSCH | $N_{RB}{}^{RA}$, Allocation expressed in number of RBs for PUSCH | $\overline{k}$ |
|---|---|---|---|---|
| 1151 | 120 | 960 | 12 + A | $A*12*SCS_{PUSCH}/120/2$ |

In Table 17, when a PRACH sequence length is 139, SCS for a PRACH is 120 kHz, and SCS for a PUSCH is 960 kHz, a value of $N_{RB}{}^{RA}$ (i.e., X) and a value of $\overline{k}$ (i.e., Y) may be defined as follows.

1) $N_{RB}{}^{RA}$ (i.e., X) may be defined as 2: The L-139 PRACH sequence occupies 12 PRBs for 120 kHz SCS (i.e., 144 REs). If this corresponds to 960 kHz SCS, 1.5 PRBs are occupied, but for convenience of PUSCH scheduling, X can be defined as 2.

Figure 19:
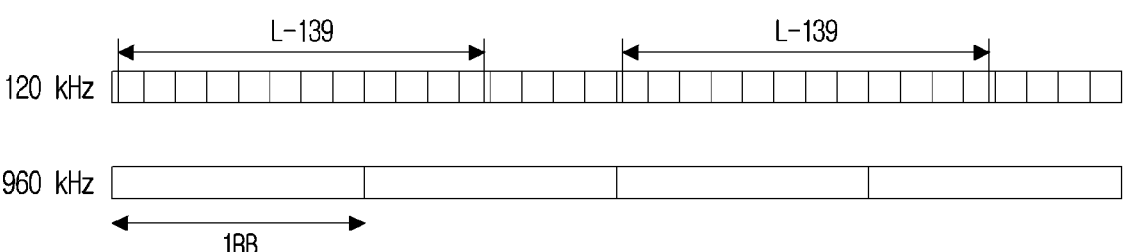
FIG. 19 illustrates PRACH sequence mapping according to one embodiment of the present disclosure.

FIG. 19 illustrates PRACH sequence mapping according to one embodiment of the present disclosure.

In FIG. 19, when SCS for a PRACH is 120 kHz and SCS for a PUSCH is 960 kHz, mapping of a PRACH sequence to frequency resources is exemplified.

a. If X is 2, a problem may occur that a PRACH sequence is located at one end of 2 RBs of 960 kHz SCS as shown in FIG. 19.

b. a value of $\overline{k}$ (i.e., Y) may be appropriately configured so that a PRACH sequence is not located at one end of 2 RBs of 960 KHz SCS.

For example, Y may be a number (or index) of REs covering n (n=1 or 2 or 3) PRBs, such as 12*n (e.g., 12, 24, 36). Alternatively, as another example, Y may be a value obtained by adding a specific value m (e.g., 2, which is $\overline{k}$ value of the existing L139 sequence) REs to a number of REs (or indexes) covering n (n=1 or 2 or 3) PRBs such as 12*n+m (e.g., 14, 26, 38).

Here, as shown in FIG. 18, since 960 KHz 2 RB is larger than 12 RBs of 120 KHz SCS by 4 RBs based on 120 KHz SCS, possible values of n may be 1, 2, 3, etc.

2) $N_{RB}{}^{RA}$ (i.e., X) may be defined as 1.5: Referring to FIG. 19, since 12 RBs based on 120 KHz SCS occupy 1.5 RBs based on 960 kHz, X may be defined as 1.5.

Here, although X may be defined as 1.5 regardless of a number of FDMed ROs, a value of X may be configured to vary according to the number of FDMed ROs.

For example, when FDMed RO is 1, X may be configured/defined as 2, and when FDMed RO is not 1 (e.g., 2, 4, 8), X may be configured/defined as 1.5.

Meanwhile, in a case of a sequence length of 1151, since a frequency guard is only 1 RE, it may be narrow to serve as a guard. Therefore, an additional configuration may be required as follows.

1) Since 1151 RE of 120 kHz SCS occupies as much as 96, 24, and 12 resource blocks (RBs) when PUSCH SCS is 120, 480, and 960 kHz, respectively, a value of $N_{RB}{}^{RA}$ may be considered as 96, 24, and 12 when PUSCH SCS is 120, 480, and 960 kHz, respectively.

2) Here, in order to solve the problem that the above-mentioned frequency guard is narrow because there is only 1 RE, when PUSCH SCS is 120, 480, and 960 kHz, respectively, a value of $N_{RB}{}^{RA}$ may be configured higher than 96, 24, and 12 by a specific value (A). That is, a value of $N_{RB}{}^{RA}$ may be 96+A, 24+A, and 12+A when PUSCH SCSs are 120, 480, and 960 KHz, respectively.

Here, a specific value A may be configured by a base station or may be a predetermined value. In addition, a specific value (A) may be configured/defined independently of PUSCH SCS or individually configured/defined according to PUSCH SCS.

For example, if a value of A is 0.5, a value of $N_{RB}{}^{RA}$ may be 96.5, 24.5, and 12.5 when PUSCH SCS is 120, 480, and 960 kHz, respectively.

As another example, if a value of A is 1, a value of $N_{RB}{}^{RA}$ may be 97, 25, or 13 when PUSCH SCS is 120, 480, or 960 kHz, respectively. In addition, when a value of A is 2, a value of $N_{RB}{}^{RA}$ RA may be 98, 26, or 14 when PUSCH SCS is 120, 480, or 960 kHz, respectively.

In addition, a value of $\overline{k}$ may be configured to a predefined formula or a specific value according to the specific value (A). Here, a specific value may be configured by a base station or may be a predetermined value. In addition, a value of $\overline{k}$ may be configured/defined independently of PUSCH SCS or individually configured/defined according to PUSCH SCS.

a. Here, $A*12*SCS_{PUSCH}/120/2+1$ or $A*12*SCS_{PUSCH}/120/2$ may be considered as the previously defined formula for a value of k. This formula can be obtained by applying a scheme in which an added RB is an A RB, converts it into a number of REs corresponding to PRACH SCS, and adds half of the RBs added to both ends of a PRACH sequence.

i. As an example, if A is 0.5, a value of $\overline{k}$ is:
When PUSCH SCS is 120, 0.5*12*120/120/2+1=4 or 0.5*12*120/120/2=3: or
When PUSCH SCS is 480, 0.5*12*480/120/2+1=13 or 0.5*12*480/120/2=12; or
When PUSCH SCS is 960, 0.5*12*960/120/2+1=25 or 0.5*12*960/120/2=24.

ii. As another example, if A is 1, a value of $\overline{k}$ is:
When PUSCH SCS is 120, 1*12*120/120/2+1=7 or 1*12*120/120/2=6; or
When PUSCH SCS is 480, 1*12*480/120/2+1=25 or 1*12*480/120/2=24; or
If PUSCH SCS is 960, 1*12*960/120/2+1=49 or 1*12*960/120/2=48.

iii. In the above equation, $A*12*SCS_{PUSCH}/120/2$ is equal to $A*12*2^{(\mu-3)}/2$ when SCS of a PUSCH is expressed as μ.

Here, a value of μ may be defined as shown in Table 18 below.

Table 18 shows μ values according to SCS values.

TABLE 18

| μ | $\Delta f = 2^{\mu} \cdot 15$ [KHz] |
|---|---|
| 3 | 120 |
| 5 | 480 |
| 6 | 960 | b. Alternatively, when the specific value (A) is greater than 1 RB, a value of $\overline{k}$ may be determined as a specific value (eg, 12 (=1 RB)).

In addition, a value of $N_{RB}{}^{RA}$ and a value of $\overline{k}$ may be determined as shown in Table 19 below according to an SCS value to be used in B52 (beyond 52.6 GHZ) (i.e., FR 4).

Here, when PRACH SCS is configured/defined larger than PUSCH SCS, waste of resources for a PUSCH can be prevented by using the same method as the method proposed below.

Table 19, for B52 (beyond 52.6 GHZ) (i.e., FR 4), illustrates supported combinations of SCS for a PRACH (i.e., $\Delta f_{RA}$) and SCS for a PUSCH (i.e., $\Delta f$), and allocation expressed in a number of RBs for a PUSCH (i.e., a number of RBs occupied by PRACH) ($N_{RB}^{RA}$), a corresponding value of an offset (i.e., $\overline{k}$) for PRACH sequence mapping in the allocation.

TABLE 17

| $L_{RA}$ | $\Delta f_{RA}$ for PRACH | $\Delta f$ for PUSCH | $N_{RB}^{RA}$, Allocation expressed in number of RBs for PUSCH | $\overline{k}$ |
|---|---|---|---|---|
| 139 | 120 | 480 | 3 | 1 |
| 139 | 120 | 960 | 2 | 23 |
| 139 | 480 | 120 | 48 | 2 |
| 139 | 480 | 480 | 12 | 2 |
| 139 | 480 | 960 | 6 | 2 |
| 139 | 960 | 120 | 96 | 2 |
| 139 | 960 | 480 | 24 | 2 |
| 139 | 960 | 960 | 12 | 2 |
| 571 | 120 | 120 | 48 | 2 |
| 571 | 120 | 480 | 12 | 1 |
| 571 | 120 | 960 | 7 | 47 |
| 571 | 480 | 120 | 192 | 2 |
| 571 | 480 | 480 | 48 | 2 |
| 571 | 480 | 960 | 24 | 2 |
| 1151 | 120 | 120 | 97 | 6 |
| 1151 | 120 | 480 | 25 | 23 |
| 1151 | 120 | 960 | 13 | 45 |

Referring to Table 19, it is assumed that a value of $N_{RB}^{RA}$ occupies 12 RBs (since 1 RB consists of 12RE, 12*12=144>139) for the L139 sequence, 48 RBs (12*48=576>571) for the L571 sequence, and 96 RBs (12*96=1152>1151) for the L1151 sequence based on 120 kHz SCS for a PRACH and it can be regarded that this is calculated as an RB value with PUSCH SCS. For example, for the L139 sequence, when SCS for a PRACH is 120 and SCS for a PUSCH is 480, if 12 RBs occupied by a PRACH sequence are expressed as a number of RBs for a PUSCH (i.e., $N_{RB}^{RA}$ value), it is 3 (=12/4) (here, 4 is a ratio of SCS 120 for a PRACH and SCS 480 for a PUSCH). In some cases of Table 19, when calculated in this way, space occupied by a PRACH sequence exceeds the calculated $N_{RB}^{RA}$ value, so the calculated value is +1 RB. For example, for the L571 sequence, when SCS for a PRACH is 120 and SCS for a PUSCH is 960, 48 RBs occupied by a PRACH sequence are expressed as a number of RBs for a PUSCH (i.e., $N_{RB}^{RA}$ value), 6 (=48/8)+1.

However, in this simple calculation, a PUSCH resource region that is left empty (not used) for a PRACH sequence may be configured to be larger than resources actually occupied by a PRACH sequence. Accordingly, waste of resources may occur, which will be described in more detail with reference to the drawings below.

Figure 20:
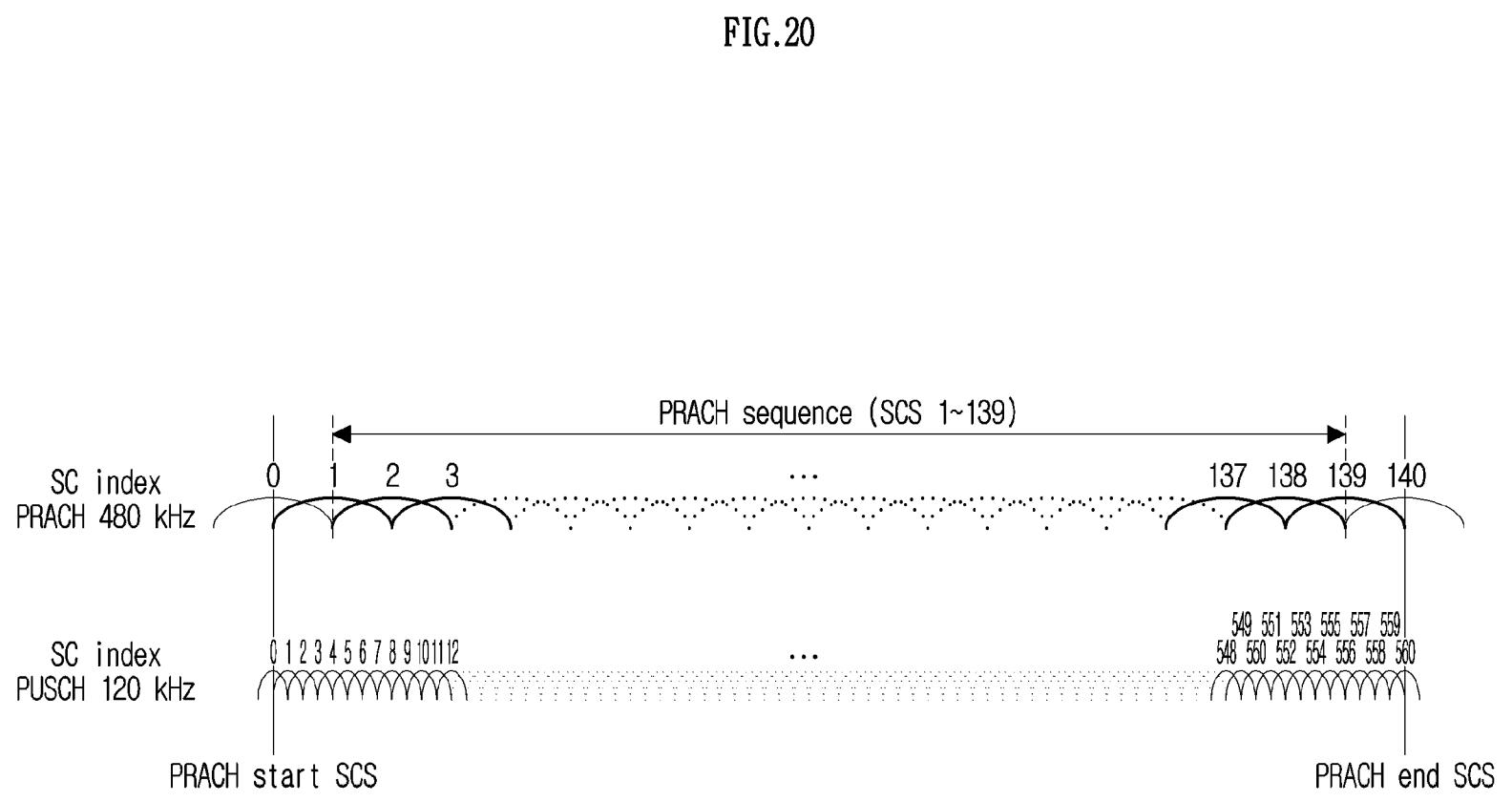
Figure 21:
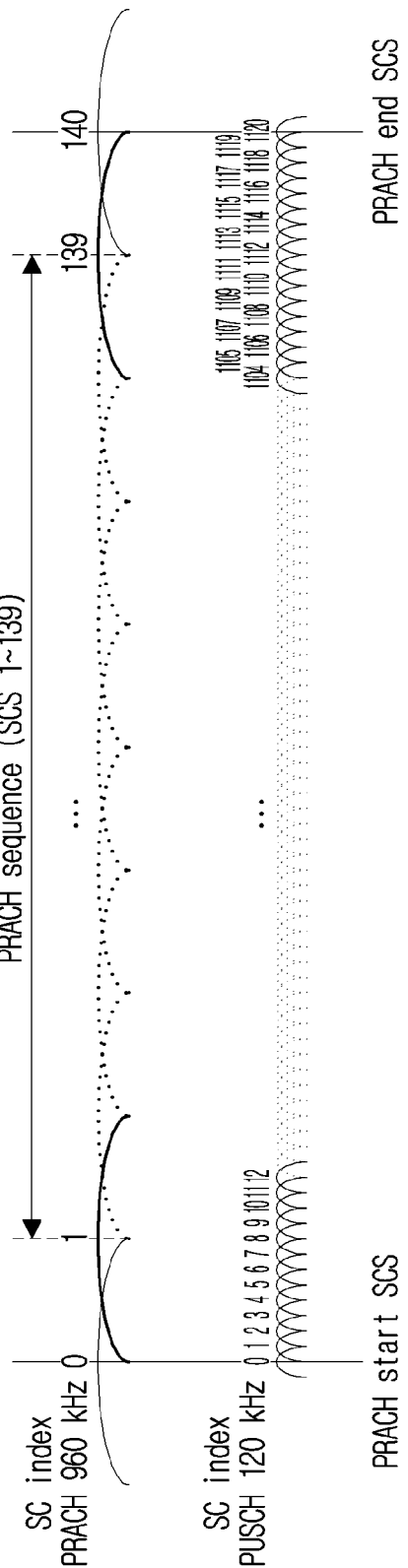

FIG. 20 and FIG. 21 are diagrams illustrating PRACH sequence mapping according to an embodiment of the present disclosure.

In FIG. 20, the L139 sequence is used for a PRACH, SCS for a PRACH is configured to 480 kHz, and SCS for a PUSCH is configured to 120 KHz.

Referring to FIG. 20, it can be seen that there is no problem even if a PRACH sequence occupies only 47 RBs corresponding to 120 KHz SCS.

Here, a 120 KHz SC index corresponding to (i.e., a center frequency of each SCS coincides in a frequency domain) a 480 KHz subcarrier (SC) index can be obtained by multiplying the 480 KHz SC index by 4. That is, a 120 KHz SCS index corresponding to 480 KHz SC index 1 is 4, and a 120 KHz SCS index corresponding to 480 KHz SCS index 140 is 560. That is, since 560 REs (or SCs) of 120 KHz SCS is 46 RBs+8 REs (or SCs) (46*12+8=560 REs (or SCs)), only 47 RBs corresponding to 120 kHz SCS can include an entire L139 PRACH sequence corresponding to 480 KHz SCS.

However, in Table 19 to be used for B52 (beyond 52.6 GHZ) (i.e., FR 4), 48 RBs, so 1 RB may be wasted. In particular, since this value is reflected in every FDMed RO, when 8 FDMed ROs are allocated, up to 8 RBs may be wasted.

In FIG. 21, the L139 sequence is used for a PRACH, SCS for a PRACH is configured to 960 kHz, and SCS for a PUSCH is configured to 120 KHz.

Referring to FIG. 21, a 120 KHz SC index corresponding to (i.e., a center frequency of each SCS coincides in a frequency domain) a 960 KHz SC index can be obtained by multiplying the 960 KHz SC index by 8. That is, a 120 KHz SCS index corresponding to 960 KHz SC index 1 is 8, and a 120 KHz SCS index corresponding to 960 KHz SCS index 140 is 1120. That is, since 1120 REs (or SCs) of 120 KHz SCS is 93 RBs+4 REs (or SCs) (93*12+4=1120), so if you only have 94 RBs corresponding to 120 KHz SCS, with only 94 RBs corresponding to 120 KHz SCS, all L139 PRACH sequences corresponding to 960 kHz SCS can be included.

However, in Table 19 to be used for B52 (beyond 52.6 GHZ) (i.e., FR 4), 96 RBs are used, so 2 RBs are wasted. As mentioned above, since this value is reflected in every FDMed RO, up to 16 RBs may be wasted when 8 FDMed ROs are allocated.

That is, in Table 19, resource waste may occur because PRACH allocation (i.e., a number of RBs occupied by a PRACH) expressed as a number of RBs for a PUSCH is calculated based on a PRACH SCS-based RB to which a PRACH sequence is mapped.

Therefore, in order to solve the above problem, in this proposal, a method for calculating PRACH allocation (i.e., a number of RBs occupied by a PRACH) expressed as a number of RBs for a PUSCH based on a PRACH SCS-based RE (or subcarrier) to which a PRACH sequence is mapped (corresponding) is proposed. In other words, in Table 19, by applying a ratio of PRACH SCS and PUSCH SCS to PRACH SCS-based RBs to which a PRACH sequence is mapped (corresponds), PRACH allocation expressed as a number of RBs for a PUSCH in a frequency domain (i.e., a number of RBs occupied by a PRACH) was calculated. However, in this proposal, in order to prevent resource waste, by applying a ratio of PRACH SCS and PUSCH SCS to PRACH SCS-based REs (or subcarriers) (i.e., other than RBs) to which a PRACH sequence is mapped (corresponds), in a frequency domain, PRACH allocation expressed as a number of RBs for a PUSCH (i.e., a number of RBs occupied by a PRACH) can be calculated.

That is, PRACH allocation (i.e., a number of RBs occupied by a PRACH) ($N_{RB}^{RA}$ value) expressed as a number of RBs for a PUSCH in a frequency domain may be determined as a minimum number of RBs to which a PRACH is mappable based on i) SCS for a PRACH, ii) SCS for a PUSCH, and iii) a length of a PRACH sequence.

For example, PRACH resource allocation expressed as a number of RBs for a PUSCH in a frequency domain (i.e., $N_{RB}^{RA}$ value) may be determined using Equation 3 proposed below.

$$N_{RB}^{RA} = \left\lceil \frac{((L_{RA}+1) \times \Delta f_{RA})}{12 \times \Delta f} \right\rceil \qquad \text{[Equation 3]}$$

In Equation 3, $\lceil x \rceil$ (i.e., ceil(x) operation) represents a smallest integer not smaller than x. When calculated for the example of FIG. 20 above based on Equation 3, a value of $N_{RB}{}^{RA}$ is obtained as ceil $\{((139+1)*480)/(12*120)\}=47$. In addition, when calculated the example of FIG. 21 above based on Equation 3, a value of $N_{RB}{}^{RA}$ is obtained as ceil $\{((139+1)*960)/(12*120)\}=94$.

In addition, based on the value of $N_{RB}{}^{RA}$ calculated according to the above method, a value of $\bar{k}$ may be calculated through Equation 4 below.

$$\bar{k} = \left\lfloor \frac{((12N_{RB}^{RA} - 1) \times \Delta f - (L_{RA} - 1) \times \Delta f_{RA})}{2\Delta f_{RA}} \right\rfloor \qquad \text{[Equation 4]}$$

In Equation 4, $\lfloor x \rfloor$ (i.e., floor(x) operation) represents a largest integer not greater than x. When calculating for the example of FIG. 20 above based on Equation 4, a value of $\bar{k}$ is obtained as floor$\{((12*47-1)*120-(139-1)*480)/(2*480)\}=1$. In addition, when calculating for the example of FIG. 21 above based on Equation 4, a value of $\bar{k}$ is obtained as floor $\{((12*94-1)*120-(139-1)*960)/(2*960)\}=1$.

That is, an offset ($\bar{k}$) for mapping a PRACH sequence within a number of RBs occupied by a PRACH is determined such that a PRACH sequence is located at a center within RBs occupied by a PRACH. In other words, an offset ($\bar{k}$) for mapping a PRACH sequence within a number of RBs occupied by a PRACH may also be determined such that a PRACH sequence is located at a center within RBs occupied by a PRACH, based on i) SCS for a PRACH, ii) SCS for a PUSCH, and iii) a length of a PRACH sequence.

Therefore, as shown in Table 20 below, values that can minimize RB waste by reducing $N_{RB}{}^{RA}$ are proposed. In particular, Table 20 proposes a new $N_{RB}{}^{RA}$ value that can minimize RB waste by reducing $N_{RB}{}^{RA}$ and a corresponding a value of $\bar{k}$ for the case where PRACH SCS is greater than PUSCH SCS (excluding combinations with no change compared to Table 19 above).

Table 20, for B52 (beyond 52.6 GHZ) (i.e., FR 4) according to an embodiment of the present disclosure, illustrates supported combinations of SCS for a PRACH (i.e., $\Delta fR_A$) and SCS for a PUSCH (i.e., $\Delta f$), and allocation expressed in a number of RBs for a PUSCH (i.e., a number of RBs occupied by PRACH) ($N_{RB}{}^{RA}$), a corresponding value of an offset (i.e., $\bar{k}$) for PRACH sequence mapping in the allocation.

TABLE 20

| $L_{RA}$ | $\Delta f_{RA}$ for PRACH | $\Delta f$ for PUSCH | $N_{RB}{}^{RA}$, Allocation expressed in number of RBs for PUSCH | $\bar{k}$ |
|---|---|---|---|---|
| 139 | 480 | 120 | 47 | 1 |
| 139 | 960 | 120 | 94 | 1 |
| 571 | 480 | 120 | 191 | 1 |

In addition, $\bar{k}$ can be obtained as 1 by Equation 4 above using a value of $N_{RB}{}^{RA}$ calculated through Equation 3 above. However, since a problem that a guard band may be narrow may occur, Equation 5 for determining a value of $N_{RB}{}^{RA}$ is proposed to prevent this.

$$N_{RB}^{RA} = \left\lceil \frac{((L_{RA} + 1) \times \Delta f_{RA})}{12 \times \Delta f} \right\rceil + 1 \qquad \text{[Equation 5]}$$

Referring to Equation 5, it is the same as Equation 3 above in that a PUSCH SCS-based RB is calculated based on a PRACH SCS-based RE (or subcarrier) to which a PRACH sequence is mapped. However, there is a difference only in that 1 RB is added in Equation 3. That is, PRACH allocation (i.e., a number of RBs occupied by a PRACH) ($N_{RB}{}^{RA}$ value) expressed as a number of RBs for a PUSCH in a frequency domain may be determined by a minimum number of RBs to which a PRACH can be mapped +1 based on i) SCS for a PRACH, ii) SCS for a PUSCH, and iii) a length of a PRACH sequence. In other words, a value of $N_{RB}{}^{RA}$ may be determined by adding 1 to a resultant value according to Equation 3.

For example, as a special case, Equation 5 may be used instead of Equation 3 only when a value of $\bar{k}$ is 1, but the present disclosure is not limited thereto.

Based on Equation 5, when calculated for the example of FIG. 20 above, a value of $N_{RB}{}^{RA}$ is obtained as ceil $\{((139+1)*480)/(12*120)\}+1=48$. In addition, when calculated the example of FIG. 21 above based on Equation 5, a value of $N_{RB}{}^{RA}$ is obtained as ceil $\{((139+1)*960)/(12*120)\}+1=95$. In this case, a gain can be obtained compared to the existing Table 19 only for the example of FIG. 21. For the example of FIG. 21, if a value of k is calculated using Equation 4 based on the $N_{RB}{}^{RA}$ value calculated according to FIG. 5, floor$\{((12*95-1)*120-(139-1)*960)/(2*960)\}=2$ is obtained.

Therefore, as shown in Table 21 below, while a value of $\bar{k}$ does not equal 1, values that can minimize RB waste by reducing $N_{RB}{}^{RA}$ are proposed. In particular, Table 21 proposes, while a value of $\bar{k}$ does not equal 1, a new $N_{RB}{}^{RA}$ value that can minimize RB waste by reducing $N_{RB}{}^{RA}$ and a corresponding a value of $\bar{k}$ for the case where PRACH SCS is greater than PUSCH SCS (excluding combinations with no change compared to Table 19 above).

Table 21, for B52 (beyond 52.6 GHZ) (i.e., FR 4) according to an embodiment of the present disclosure, illustrates supported combinations of SCS for a PRACH (i.e., $\Delta f_{RA}$) and SCS for a PUSCH (i.e., $\Delta f$), and allocation expressed in a number of RBs for a PUSCH (i.e., a number of RBs occupied by PRACH) ($N_{RB}{}^{RA}$), a corresponding value of an offset (i.e., $\bar{k}$) for PRACH sequence mapping in the allocation.

TABLE 21

| $L_{RA}$ | $\Delta f_{RA}$ for PRACH | $\Delta f$ for PUSCH | $N_{RB}{}^{RA}$, Allocation expressed in number of RBs for PUSCH | $\bar{k}$ |
|---|---|---|---|---|
| 139 | 960 | 120 | 95 | 2 |

Since examples of the above-described proposed schemes may also be included as one of the implementation methods of the present disclosure, it is obvious that they may be regarded as a kind of proposed schemes. In addition, the above-described proposed schemes may be implemented independently, but may also be implemented in a combination (or merged) form of some proposed schemes. A Rule may be defined so that a base station informs a UE of information on whether the proposed methods are applied (or information on a rule of the proposed methods) through a predefined signal (e.g., a physical layer signal or a higher layer signal). A higher layer may include, for example, one or more of functional layers such as MAC, RLC, PDCP, RRC, and Service Data Adaption Protocol (SDAP).

Figure 22:
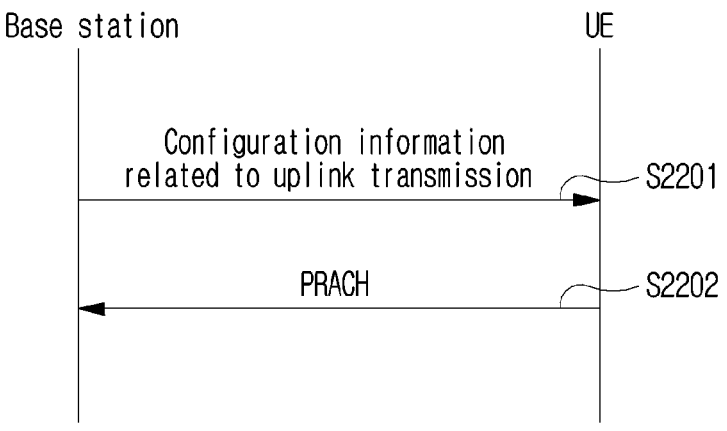
FIG. 22 is a diagram illustrating a signaling procedure between a base station and a UE for a method for transmitting and receiving a PRACH according to an embodiment of the present disclosure.

FIG. 22 is a diagram illustrating a signaling procedure between a base station and a UE for a method for transmitting and receiving a PRACH according to an embodiment of the present disclosure.

FIG. 22 illustrates a signaling procedure between a user equipment (UE) and a base station (BS) based on the previously proposed method (e.g., any one of Embodiments 1 to 3 or a combination of one or more Embodiments). An example in FIG. 22 is for convenience of a description, and it does not limit a scope of the present disclosure. Some step(s) illustrated in FIG. 22 may be omitted according to a situation and/or a configuration. In addition, in FIG. 22, a base station and a UE are just one example, and may be implemented by a device illustrated in the following FIG. 25. For example, a processor 102/202 in FIG. 25 may control to transmit and receive a channel/a signal/data/information, etc. by using a transceiver 106/206 and may also control to store a channel/a signal/data/information, etc. which will be transmitted or received in a memory 104/204.

In addition, in an operation between a base station and a UE of FIG. 22, the above-described description may be referenced/used even if there is no separate mention.

A base station may mean a generic term for an object that transmits and receives data with a UE. For example, the base station may be a concept including one or more transmission points (TPs), one or more transmission and reception points (TRPs), etc. Also, the TP and/or the TRP may include a panel of a base station, a transmission and reception unit, etc. In addition, "TRP" may be substituted with expressions such as a panel, an antenna array, and a cell (e.g., macro cell/small cell/pico cell, etc.). Expressions such as a cell (pico cell, etc.), a transmission point (TP), a base station (base station, gNB, etc.), etc. and may be applied. As described above, TRPs may be classified according to information (e.g., an index, an identifier (ID)) of a CORESET group (or CORESET pool). For example, when one UE is configured to transmit/receive with multiple TRPs (or cells), this may mean that multiple CORESET groups (or CORESET pools) are configured for one UE. A configuration of such a CORESET group (or CORESET pool) may be performed through higher layer signaling (e.g., RRC signaling, etc.).

In reference to FIG. 22, for convenience of a description, signaling between a base station and a UE is considered, but a corresponding signaling method may be extended and applied to signaling between a plurality of TRPs and a plurality of UEs. In the following description, a base station may be interpreted as one TRP. Alternatively, a base station may include a plurality of TRPs, or may be one cell including a plurality of TRPs.

Referring to FIG. 22, a UE receives configuration information related to uplink transmission from a base station (S2201).

Here, uplink transmission includes an uplink channel such as a PRACH and a PUSCH, an uplink signal such as an SRS, and the configuration information may be transmitted through higher layer signaling (e.g., SIB, RRC signaling, MAC CE, etc.).

For example, the configuration information may include at least one of configuration(s) related to a timing gap duration determined by OFDM symbol level between ROs and/or POs, a RACH configuration index, information related to a PRACH format (e.g., A1, B1, A1, B2, etc.) (or information for determining a PRACH format), information related to a PRACH sequence (e.g., sequence root index, length, etc. (or information for determining the PRACH sequence), in relation to the above Embodiments.

In addition, the configuration information may include PRACH SCS information and PUSCH SCS information. For example, a UE may receive a common configuration (e.g., ServingCellConfigCommon) of a serving cell for configuring a specific parameter of a serving cell from a base station through an SSB, a MIB, an SIB, RRC signaling, etc. A common configuration (e.g., ServingCellConfigCommon) of a serving cell may include an uplink common configuration (e.g., UplinkConfigCommon) for providing common uplink parameters of a cell. An uplink common configuration (e.g., UplinkConfigCommon) may include a common parameter configuration (e.g., BWP-UplinkCommon) of an (initial) uplink BWP. A common parameter configuration (e.g., BWP-UplinkCommon) of an (initial) uplink BWP may include a RACH common configuration (e.g., rach-ConfigCommon) for specifying general BWP parameters (e.g., genericParameters) and cell-specific random access parameters, and a common configuration for Msg. A (e.g., msgA-ConfigCommon). A RACH common configuration (e.g., rach-ConfigCommon) may include SCS information for Msg. 1 (e.g., msg1-SubcarrierSpacing). A common configuration for Msg. A (e.g., msgA-ConfigCommon) may include a RACH common configuration for two-step random access (e.g., RACH-ConfigCommonTwoStepRA), and a RACH common configuration for two-step random access (e.g., RACH-ConfigCommonTwoStepRA) may include SCS for Msg. A (e.g., msgA-SubcarrierSpacing). In addition, for example, a PRACH format may be determined based on SCS of a PRACH (and/or) SCS of a PUSCH, and a PRACH sequence length may be determined based on a PRACH format.

A UE transmits a PRACH to a base station based on the configuration information (S2202).

Here, according to the above Embodiment 1, a transmission time resource (i.e., RACH slot and/or RO) of a PRACH may be determined.

In addition, although not shown in FIG. 22, a UE may further receive DCI from a base station, and a length of a PRACH sequence may be indicated by DCI according to the Embodiment 2.

In addition, according to Embodiment 3 above, a size of a frequency resource to which a PRACH is mapped (i.e., a number of RBs) may be determined. More specifically, a number of RBs occupied by a PRACH, expressed as a number of RBs for a PUSCH, may be determined based on i) SCS of a PRACH, ii) SCS of a PUSCH and iii) a length of a PRACH sequence. In particular, for example, a number of RBs occupied by a PRACH, expressed as a number of RBs for a PUSCH, may be determined as a minimum number of RBs to which a PRACH sequence can be mapped. Here, only when SCS of a PRACH is greater than SCS of a PUSCH, a number of RBs occupied by a PRACH, expressed as a number of RBs for a PUSCH, may be determined as a minimum number of RBs to which a PRACH sequence can be mapped. For example, a number of RBs occupied by a PRACH, expressed as a number of RBs for a PUSCH, may be determined by Equation 3 above.

In addition, according to the above Embodiment 3, an offset for mapping a PRACH sequence in RBs occupied by a PRACH may be determined based on i) SCS of a PRACH, ii) SCS of a PUSCH, and iii) a length of a PRACH sequence. In particular, for example, an offset for mapping a PRACH sequence within RBs occupied by a PRACH may be determined such that a PRACH sequence is located at a center of RBs occupied by a PRACH. For example, an offset for mapping a PRACH sequence in RBs occupied by a PRACH may be determined by Equation 4 above.

In addition, according to the above Embodiment 3, a number of RBs occupied by a PRACH expressed as a number of RBs for a PUSCH may be determined by Equation 5. That is, a number of RBs occupied by a PRACH, which is expressed as a number of RBs for a PUSCH, may be determined as a minimum number of RBs to which a PRACH sequence can be mapped +1.

Meanwhile, the step S2202 may correspond to the step 1 (transmitting a random access preamble) of FIG. 10(a). In this case, although not shown in FIG. 22, the steps 2 to 4 of FIG. 10(a) may be performed after the step S2202.

In addition, the step S2202 may correspond to the step 1 (transmitting a random access preamble) of FIG. 10(b). In this case, although not shown in FIG. 22, the step 0 may be performed before the step S2202, and the step 2 of FIG. 10(b) may be performed after the step S2202.

In addition, the step S2202 may correspond to the step of transmitting a random access preamble of FIG. 11(a). In this case, although not shown in FIG. 22, the step of receiving MsgB of FIG. 11(a) may be performed after the step S2202.

In addition, the step S2202 may correspond to the step of transmitting the random access preamble of FIG. 11(b). In this case, although not shown in FIG. 22, the step of receiving MsgB of FIG. 11(b) may be performed after the step S2202.

Figure 23:
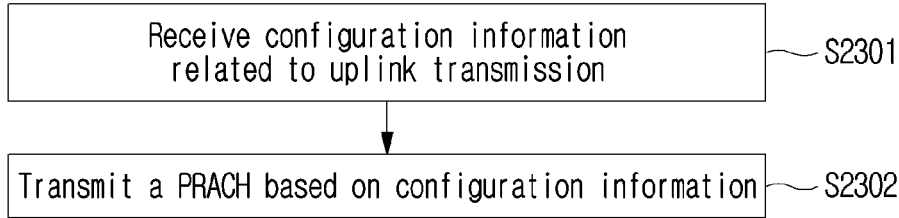
FIG. 23 is a diagram illustrating an operation of a UE for a method for transmitting and receiving a PRACH according to an embodiment of the present disclosure.

FIG. 23 is a diagram illustrating an operation of a UE for a method for transmitting and receiving a PRACH according to an embodiment of the present disclosure.

FIG. 23 illustrates an operation of a user equipment (UE) based on the previously proposed method (e.g., any one of Embodiments 1 to 3 or a combination of one or more Embodiments). An example in FIG. 23 is for convenience of a description, and it does not limit a scope of the present disclosure. Some step(s) illustrated in FIG. 23 may be omitted according to a situation and/or a configuration. In addition, in FIG. 23, a UE is just one example, and may be implemented by a device illustrated in the following FIG. 25. For example, a processor 102/202 in FIG. 25 may control to transmit and receive a channel/a signal/data/information, etc. (e.g., RRC signaling, MAC CE, DCI for UL/DL scheduling, SRS, PDCCH, PDSCH, PUSCH, PUCCH, PHICH, etc.) by using a transceiver 106/206 and may also control to store a channel/a signal/data/information, etc. which will be transmitted or received in a memory 104/204.

Referring to FIG. 23, a UE receives configuration information related to uplink transmission from a base station (S2301).

Here, uplink transmission includes an uplink channel such as a PRACH and a PUSCH, an uplink signal such as an SRS, and the configuration information may be transmitted through higher layer signaling (e.g., SIB, RRC signaling, MAC CE, etc.).

For example, the configuration information may include at least one of configuration(s) related to a timing gap duration determined by OFDM symbol level between ROs and/or POs, a RACH configuration index, information related to a PRACH format (e.g., A1, B1, A1, B2, etc.) (or information for determining a PRACH format), information related to a PRACH sequence (e.g., sequence root index, length, etc. (or information for determining the PRACH sequence), in relation to the above Embodiments.

In addition, the configuration information may include information on SCS of a PRACH and information on SCS of a PUSCH. In addition, for example, a PRACH format may be determined based on SCS of a PRACH (and/or) SCS of a PUSCH, and a PRACH sequence length may be determined based on a PRACH format.

A UE transmits a PRACH to a base station based on the configuration information (S2302).

Here, according to the above Embodiment 1, a transmission time resource (i.e., RACH slot and/or RO) of a PRACH may be determined.

In addition, although not shown in FIG. 23, a UE may further receive DCI (e.g., for scheduling uplink/downlink data) from a base station, and a length of a PRACH sequence may be indicated by DCI according to the Embodiment 2.

In addition, according to Embodiment 3 above, a size of a frequency resource to which a PRACH is mapped (i.e., a number of RBs) may be determined. More specifically, a number of RBs occupied by a PRACH, expressed as a number of RBs for a PUSCH, may be determined based on i) SCS of a PRACH, ii) SCS of a PUSCH and iii) a length of a PRACH sequence. In particular, for example, a number of RBs occupied by a PRACH, expressed as a number of RBs for a PUSCH, may be determined as a minimum number of RBs to which a PRACH sequence can be mapped. Here, only when SCS of a PRACH is greater than SCS of a PUSCH, a number of RBs occupied by a PRACH, expressed as a number of RBs for a PUSCH, may be determined as a minimum number of RBs to which a PRACH sequence can be mapped. For example, a number of RBs occupied by a PRACH, expressed as a number of RBs for a PUSCH, may be determined by Equation 3 above.

In addition, according to the above Embodiment 3, an offset for mapping a PRACH sequence in RBs occupied by a PRACH may be determined based on i) SCS of a PRACH, ii) SCS of a PUSCH, and iii) a length of a PRACH sequence. In particular, for example, an offset for mapping a PRACH sequence within RBs occupied by a PRACH may be determined such that a PRACH sequence is located at a center of RBs occupied by a PRACH. For example, an offset for mapping a PRACH sequence in RBs occupied by a PRACH may be determined by Equation 4 above.

In addition, according to the above Embodiment 3, a number of RBs occupied by a PRACH expressed as a number of RBs for a PUSCH may be determined by Equation 5. That is, a number of RBs occupied by a PRACH, which is expressed as a number of RBs for a PUSCH, may be determined as a minimum number of RBs to which a PRACH sequence can be mapped +1.

Meanwhile, the step S2302 may correspond to the step 1 (transmitting a random access preamble) of FIG. 10(a). In this case, although not shown in FIG. 23, the steps 2 to 4 of FIG. 10(a) may be performed after the step S2302.

In addition, the step S2302 may correspond to the step 1 (transmitting a random access preamble) of FIG. 10(b). In this case, although not shown in FIG. 23, the step 0 may be performed before the step S2302, and the step 2 of FIG. 10(b) may be performed after the step S2302.

In addition, the step S2302 may correspond to the step of transmitting a random access preamble of FIG. 11(a). In this case, although not shown in FIG. 23, the step of receiving MsgB of FIG. 11(a) may be performed after the step S2302.

In addition, the step S2302 may correspond to the step of transmitting the random access preamble of FIG. 11(b). In this case, although not shown in FIG. 23, the step of receiving MsgB of FIG. 11(b) may be performed after the step S2302.

Figure 24:
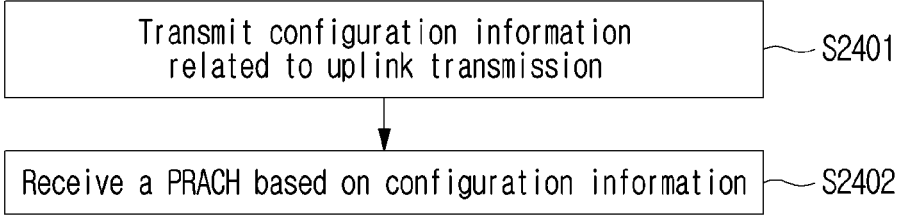
FIG. 24 is a diagram illustrating an operation of a base station for a method for transmitting and receiving a PRACH according to an embodiment of the present disclosure.

FIG. 24 is a diagram illustrating an operation of a base station for a method for transmitting and receiving a PRACH according to an embodiment of the present disclosure.

FIG. 24 illustrates an operation of a base station based on the previously proposed method (e.g., any one of Embodiments 1 to 3 or a combination of one or more Embodiments). An example in FIG. 24 is for convenience of a description, and it does not limit a scope of the present disclosure. Some step(s) illustrated in FIG. 24 may be omitted according to a situation and/or a configuration. In addition, in FIG. 24, a base station is just one example, and may be implemented by a device illustrated in the following FIG. 25. For example, a processor 102/202 in FIG. 25 may control to transmit and receive a channel/a signal/data/information, etc. (e.g., RRC signaling, MAC CE, DCI for UL/DL scheduling, SRS, PDCCH, PDSCH, PUSCH, PUCCH, PHICH, etc.) by using a transceiver 106/206 and may also control to store a channel/a signal/data/information, etc. which will be transmitted or received in a memory 104/204.

Referring to FIG. 24, a base station transmits configuration information related to uplink transmission to a UE (S2401).

Here, uplink transmission includes an uplink channel such as a PRACH and a PUSCH, an uplink signal such as an SRS, and the configuration information may be transmitted through higher layer signaling (e.g., SIB, RRC signaling, MAC CE, etc.).

For example, the configuration information may include at least one of configuration(s) related to a timing gap duration determined by OFDM symbol level between ROs and/or POs, a RACH configuration index, information related to a PRACH format (e.g., A1, B1, A1, B2, etc.) (or information for determining a PRACH format), information related to a PRACH sequence (e.g., sequence root index, length, etc. (or information for determining the PRACH sequence), in relation to the above Embodiments.

In addition, the configuration information may include information on SCS of a PRACH and information on SCS of a PUSCH. In addition, for example, a PRACH format may be determined based on SCS of a PRACH (and/or) SCS of a PUSCH, and a PRACH sequence length may be determined based on a PRACH format.

A base station receives a PRACH from a UE based on the configuration information (S2402).

Here, according to the above Embodiment 1, a transmission time resource (i.e., RACH slot and/or RO) of a PRACH may be determined.

In addition, although not shown in FIG. 24, a base station may further transmit DCI (e.g., for scheduling uplink/downlink data) to a UE, and a length of a PRACH sequence may be indicated by DCI according to the Embodiment 2.

In addition, according to Embodiment 3 above, a size of a frequency resource to which a PRACH is mapped (i.e., a number of RBs) may be determined. More specifically, a number of RBs occupied by a PRACH, expressed as a number of RBs for a PUSCH, may be determined based on i) SCS of a PRACH, ii) SCS of a PUSCH and iii) a length of a PRACH sequence. In particular, for example, a number of RBs occupied by a PRACH, expressed as a number of RBs for a PUSCH, may be determined as a minimum number of RBs to which a PRACH sequence can be mapped. Here, only when SCS of a PRACH is greater than SCS of a PUSCH, a number of RBs occupied by a PRACH, expressed as a number of RBs for a PUSCH, may be determined as a minimum number of RBs to which a PRACH sequence can be mapped. For example, a number of RBs occupied by a PRACH, expressed as a number of RBs for a PUSCH, may be determined by Equation 3 above.

In addition, according to the above Embodiment 3, an offset for mapping a PRACH sequence in RBs occupied by a PRACH may be determined based on i) SCS of a PRACH, ii) SCS of a PUSCH, and iii) a length of a PRACH sequence. In particular, for example, an offset for mapping a PRACH sequence within RBs occupied by a PRACH may be determined such that a PRACH sequence is located at a center of RBs occupied by a PRACH. For example, an offset for mapping a PRACH sequence in RBs occupied by a PRACH may be determined by Equation 4 above.

In addition, according to the above Embodiment 3, a number of RBs occupied by a PRACH expressed as a number of RBs for a PUSCH may be determined by Equation 5. That is, a number of RBs occupied by a PRACH, which is expressed as a number of RBs for a PUSCH, may be determined as a minimum number of RBs to which a PRACH sequence can be mapped +1.

Meanwhile, the step S2402 may correspond to the step 1 (transmitting a random access preamble) of FIG. 10(*a*). In this case, although not shown in FIG. 24, the steps 2 to 4 of FIG. 10(*a*) may be performed after the step S2402.

In addition, the step S2402 may correspond to the step 1 (transmitting a random access preamble) of FIG. 10(*b*). In this case, although not shown in FIG. 24, the step 0 may be performed before the step S2402, and the step 2 of FIG. 10(*b*) may be performed after the step S2402.

In addition, the step S2402 may correspond to the step of transmitting a random access preamble of FIG. 11(*a*). In this case, although not shown in FIG. 24, the step of receiving MsgB of FIG. 11(*a*) may be performed after the step S2402.

In addition, the step S2402 may correspond to the step of transmitting the random access preamble of FIG. 11(*b*). In this case, although not shown in FIG. 24, the step of receiving MsgB of FIG. 11(*b*) may be performed after the step S2402.

General Device to which the Present Disclosure May be Applied

Figure 25:
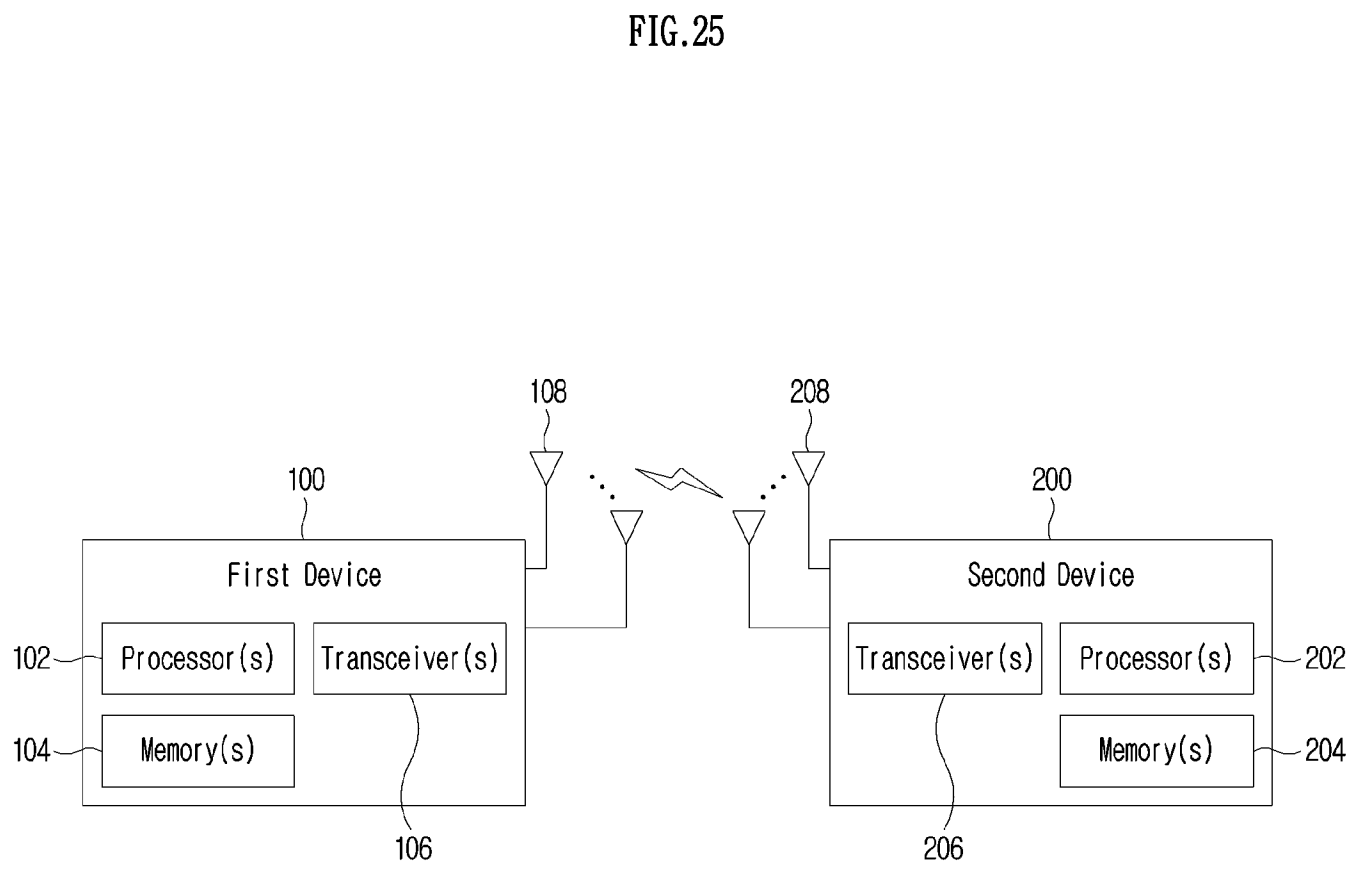

FIG. 25 is a diagram which illustrates a block diagram of a wireless communication device according to an embodiment of the present disclosure.

In reference to FIG. 25, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/ channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
   receiving, by a user equipment (UE), from a base station, configuration information related to uplink transmission; and
   transmitting, by the UE, to the base station, a first uplink channel for random access based on the configuration information,
   wherein the configuration information includes information on subcarrier spacing of the first uplink channel and information on subcarrier spacing of a second uplink channel for data transmission,
   wherein based on i) the subcarrier spacing of the first uplink channel, ii) the subcarrier spacing of the second uplink channel and iii) a length of a sequence for random access, a number of resource blocks occupied by the first uplink channel, expressed as a number of resource blocks for the second uplink channel, is determined so that the sequence for random access is mapped to a minimum number of resource blocks and an offset for mapping the sequence for random access in the resource blocks occupied by the first uplink channel is greater than 1.

2. The method of claim 1, wherein based on i) the subcarrier spacing of the first uplink channel, ii) the subcarrier spacing of the second uplink channel and iii) the length of the sequence for random access, an offset for mapping the sequence for random access in the resource blocks occupied by the first uplink channel is determined so that the sequence for random access is located at a center of the resource blocks occupied by the first uplink channel.

3. The method of claim 2, wherein the offset for mapping the sequence for random access in the resource blocks occupied by the first uplink channel is determined by the following equation, equation:

$$\bar{k} = \left\lfloor \frac{\left( \left(12N_{RB}^{RA} - 1\right) \times \Delta f - \left(L_{RA} - 1\right) \times \Delta f_{RA}\right)}{2\Delta f_{RA}} \right\rfloor$$

wherein, in the equation, $N_{RB}{}^{RA}$ is the number of resource blocks occupied by the first uplink channel, expressed as the number of resource blocks for the second uplink channel, $L_{RA}$ is the length of the sequence for random access, $\Delta f_{RA}$ is the subcarrier spacing of the first uplink channel, and $\Delta f$ is the subcarrier spacing of the second uplink channel.

4. The method of claim 1, wherein the number of resource blocks occupied by the first uplink channel, expressed as the number of resource blocks for the second uplink channel, is determined by the minimum number of resource blocks to which the sequence for random access can be mapped +1.

5. The method of claim 4, wherein the number of resource blocks occupied by the first uplink channel, expressed as the number of resource blocks for the second uplink channel, is determined by the following equation, equation:

$$N_{RB}^{RA} = \left\lceil \frac{\left(\left(L_{RA} + 1\right) \times \Delta f_{RA}\right)}{12 \times \Delta f} \right\rceil + 1$$

wherein, in the equation, $N_{RB}{}^{RA}$ is the number of resource blocks occupied by the first uplink channel, expressed as the number of resource blocks for the second uplink channel, $L_{RA}$ is the length of the sequence for random access, $\Delta f_{RA}$ is the subcarrier spacing of the first uplink channel, and $\Delta f$ is the subcarrier spacing of the second uplink channel.

6. The method of claim 1, wherein based on the length of the sequence for random access being 139, the subcarrier spacing of the first uplink channel being 960 and the subcarrier spacing of the second uplink channel being 120, the number of resource blocks occupied by the first uplink channel, expressed as the number of resource blocks for the second uplink channel, is 95 and an offset for mapping the sequence for random access in the resource blocks occupied by the first uplink channel is 2.

7. A user equipment (UE) comprising:

at least one transceiver for transmitting and receiving a wireless signal; and at least one processor for controlling the at least one transceiver, wherein the at least one processor configured to:

receive, from a base station, configuration information related to uplink transmission; and transmit, to the base station, a first uplink channel for random access based on the configuration information, wherein the configuration information includes information on subcarrier spacing of the first uplink channel and information on subcarrier spacing of a second uplink channel for data transmission, wherein based on i) the subcarrier spacing of the first uplink channel, ii) the subcarrier spacing of the second uplink channel and iii) a length of a sequence for random access, a number of resource blocks occupied by the first uplink channel, expressed as a number of resource blocks for the second uplink channel, is determined so that the sequence for random access is mapped to a minimum number of resource blocks and an offset for mapping the sequence for random access in the resource blocks occupied by the first uplink channel is greater than 1.

8. A base station comprising:

at least one transceiver for transmitting and receiving a wireless signal; and at least one processor for controlling the at least one transceiver, wherein the at least one processor configured to:

transmit, to a user equipment (UE), configuration information related to uplink transmission; and receive, from the UE, a first uplink channel for random access based on the configuration information, wherein the configuration information includes information on subcarrier spacing of the first uplink channel and information on subcarrier spacing of a second uplink channel for data transmission, wherein based on i) the subcarrier spacing of the first uplink channel, ii) the subcarrier spacing of the second uplink channel and iii) a length of a sequence for random access, a number of resource blocks occupied by the first uplink channel, expressed as a number of resource blocks for the second uplink channel-PUSCH, is determined so that the sequence for random access is mapped to a minimum number of resource blocks and an offset for mapping the sequence for random access in the resource blocks occupied by the first uplink channel is greater than 1.

* * * * *